United States Patent
Lv et al.

(10) Patent No.: US 12,447,151 B2
(45) Date of Patent: Oct. 21, 2025

(54) ALKYNE DERIVATIVE, PREPARATION METHOD FOR SAME, AND USES THEREOF

(71) Applicants: ZHEJIANG HISUN PHARMACEUTICAL CO., LTD., Zhejiang (CN); SHANGHAI ARYL PHARMTECH CO., LTD., Shanghai (CN)

(72) Inventors: Hejun Lv, Shanghai (CN); Yutao Ma, Shanghai (CN); Haibo Qiu, Shanghai (CN); Wenwen Zhao, Shanghai (CN); Taishan Hu, Shanghai (CN); Lei Chen, Zhejiang (CN)

(73) Assignees: HIS PHARMACEUTICAL CO., LTD., Zhejiang (CN); SHANGHAI ARYL PHARMTECH CO., LTD., Shanghai (CN)

( * ) Notice: Subject to any disclaimer, the term of this patent is extended or adjusted under 35 U.S.C. 154(b) by 908 days.

(21) Appl. No.: 17/625,103

(22) PCT Filed: Jul. 6, 2020

(86) PCT No.: PCT/CN2020/100376
§ 371 (c)(1),
(2) Date: Jan. 6, 2022

(87) PCT Pub. No.: WO2021/004421
PCT Pub. Date: Jan. 14, 2021

(65) Prior Publication Data
US 2022/0257602 A1 Aug. 18, 2022

(30) Foreign Application Priority Data
Jul. 8, 2019 (CN) .......................... 201910608212.0

(51) Int. Cl.
| | | |
|---|---|---|
| A61K 31/519 | (2006.01) | |
| A61K 45/06 | (2006.01) | |
| A61P 9/00 | (2006.01) | |
| A61P 11/00 | (2006.01) | |
| A61P 11/06 | (2006.01) | |
| A61P 29/00 | (2006.01) | |
| A61P 35/02 | (2006.01) | |
| A61P 37/00 | (2006.01) | |
| C07D 487/04 | (2006.01) | |

(52) U.S. Cl.
CPC ............ *A61K 31/519* (2013.01); *A61K 45/06* (2013.01); *A61P 9/00* (2018.01); *A61P 11/00* (2018.01); *A61P 11/06* (2018.01); *A61P 29/00* (2018.01); *A61P 35/02* (2018.01); *A61P 37/00* (2018.01); *C07D 487/04* (2013.01)

(58) Field of Classification Search
None
See application file for complete search history.

(56) References Cited

U.S. PATENT DOCUMENTS 9,359,365 B2 * 6/2016 Castro .................. C07D 471/04
2015/0111874 A1 4/2015 Castro et al.
2015/0290207 A1 10/2015 Kutok et al.

FOREIGN PATENT DOCUMENTS

| | | |
|---|---|---|
| CN | 105793255 A | 7/2016 |
| CN | 106456628 A | 2/2017 |
| WO | 2017214269 A1 | 12/2017 |

OTHER PUBLICATIONS

International Search Report for PCT/CN2020/100376 mailed Oct. 9, 2020, ISA/CN.
Emilio Hirsch, et al., Central Role for G ProteinÐCoupled Phosphoinositide 3-Kinase g in Inβammation, Science vol. 287, Feb. 11, 2000.
Megan M. Kaneda, et al., PI3Kγ is a molecular switch that controls immune suppression, HHS Public Access, Nature. Nov. 17, 2016, 539(7629).
Zhong Li, et al., Roles of PLC-P2 and -P3 and P13Kγ in Chemoattractant-Mediated Signal Transduction, Science vol. 287, Feb. 11, 2000.
Matthew W. D. Perry, et al., Evolution of PI3Kγ and σ Inhibitors for Inflammatory and Autoimmune Diseases, American Chemical Society, 2019, 62, 4783-4814.
Okkenhaug, Klaus, et al., Targeting PI3K in cancer: impact no tumor cells, their protective stroma, angiogenesis and immunotherapy, Cancer Discovery (2016), 6(10), 1090-1105.
Marialuisa Perrotta, et al., The multifaceted roles of PI3Kγ in Hypertension, vascular boilogy, and inflammation, International Journal of Molecular Sciences (2016), 17(11), 18581-18589.

* cited by examiner

*Primary Examiner* — Kortney L. Klinkel
*Assistant Examiner* — Dawanna Shar-Day White
(74) *Attorney, Agent, or Firm* — Yue (Robert) Xu; Apex Attorneys at Law, LLP

(57) ABSTRACT

The present invention relates to an alkyne derivative, a preparation method for same, and applications thereof in medicine. Specifically, the present invention relates to the alkyne derivative as represented by formula (I), the preparation method for same, a pharmaceutically acceptable salt thereof, and uses of them as a therapeutic agent, specifically as a phosphoinositide 3-kinase γ (PI3Kγ) inhibitor, where the definitions of the substituents in formula (I) are identical to the definitions in the description.

9 Claims, No Drawings

ALKYNE DERIVATIVE, PREPARATION METHOD FOR SAME, AND USES THEREOF

CROSS-REFERENCE

This application is the national phase of International Application No. PCT/CN2020/100376, titled "ALKYNE DERIVATIVE, PREPARATION METHOD FOR SAME, AND USES THEREOF", filed on Jul. 6, 2020, which claims the priority to Chinese Patent Application No. 201910608212.0, titled "ALKYNE DERIVATIVE, PREPARATION METHOD FOR SAME, AND USES THEREOF", filed on Jul. 8, 2019 with the China National Intellectual Property Administration, which is incorporated herein by reference in entirety.

FIELD

The present disclosure relates to a new alkyne derivative, preparation method thereof and a pharmaceutical composition containing the derivative, and its use as a therapeutic agent, especially as a phosphatidylinositol-3-kinase γ (PI3K γ) inhibitors.

BACKGROUND

Phosphoinositide 3-kinase (PI3-kinase or PI3K) is an intracellular phosphatidyl kinase related to viral oncogenes. The PI3K-Akt-mTOR signal pathway mediated by PI3K plays an important role in the development of tumors, and it can regulate tumor cell formation, survival, proliferation, migration, metabolism and apoptosis. Based on sequence homology and lipid substrate specificity, the PI3K family is divided into type I, type II and type III. Type I PI3K is a relatively widely studied type, and it is also an important target for many drug researches. All type I PI3Ks are heterodimeric proteins, each containing a small regulatory domain and a large 110 kDa catalytic domain, and exist in four subtypes, differentiated into p110α, p110β, p110γ and p110δ. Type I PI3K (p110α, p110β, p110δ or p110γ) is usually activated by tyrosine kinases or G-protein coupled receptors to produce PIP3, which engages downstream effectors such as Akt/PDK1 pathway, mTOR, Tec family kinases and GTPase of Rho family. Type II and type III PI3K play a key role in intracellular transport through the synthesis of PI(3)P and PI(3,4)P2. PI3K is a protein kinase that controls cell growth (mTORC1) or monitors genome integrity (ATM, ATR, DNA-PK and hSmg-1). The four type I PI3K subtypes show characteristic expression patterns in vivo. The expression of PI3Kα and PI3Kβ are extremely common, and they play a key role in cell growth, survival and proliferation; inhibition of PI3Kα and PI3Kβ is mainly for the treatment of cancer; PI3Kγ is widely expressed in granulocytes, monocytes and macrophages, and PI3Kδ subtype is also found in B cells and T cells. Knockout mice containing genes encoding PI3Kδ or PI3Kγ can survive, but show obvious defects in innate immunity and adaptive response. Therefore, specific PI3Kδ or PI3Kγ inhibitors may have therapeutic benefits for autoimmune diseases, and it will not interfere with the normal function of PI3K signaling on other cell systems.

At present, a variety of PI3K inhibitors have entered clinical research and even marketed, such as BEZ235, GDC-0941, CAL-101 and so on. Recent studies have found that PI3Kγ is closely related to the autoimmune system, inflammatory diseases, respiratory diseases and so on. Therefore, PI3Kγ selective inhibitors have become popular target of immunotherapy for cancer, inflammatory diseases, bone disorders, respiratory diseases, and autoimmune diseases (Matthew W D, et al., Journal of Medicinal Chemistry (2019), 62(10), 4783-4814; Perrotta et al., International Journal of Molecular Sciences (2016), 17(11), 1858/1-1858/9; Okkenhaug, Klaus, et al., Cancer Discovery (2016), 6(10), 1090-1105; Hirsch E, et al., Science (80-).2000; 287:1049-1053; Li Z. et al., Science (80-).2000; 287:1046-1049; Kaneda M M et al., Nature. 2016; 1-21). PI3Kγ selective inhibitors are potential drugs for the treatment of cancer, including hematological tumors and solid tumors; wherein the hematological tumors are selected from acute lymphocytic leukemia (ALL), chronic lymphocytic leukemia (CLL), prolymphocytic leukemia (PLL), hairy cell leukemia (HLL), Waldenstrom's macroglobulinemia (WM), peripheral T cell lymphoma (PTCL), adult T cell leukemia/lymphoma (ATL), cutaneous T cell lymphoma (CTCL), large granular lymphocytic leukemia (LGL), acute myeloid leukemia (AML), Hodgkin lymphoma (HL), non-Hodgkin lymphoma (NHL), follicular lymphoma, diffuse large B cell lymphoma (DLBCL), mantle cell lymphoma (MCL), mastocytosis, multiple myeloma (MM), myelodysplastic syndrome (MDS) or myelodysplastic disorder (MPD); wherein the solid tumor is preferably selected from brain cancer, skin cancer, head and neck cancer, neuroendocrine cancer, pancreatic cancer, lung cancer, breast cancer, prostate cancer, testicular cancer, esophageal cancer, liver cancer, stomach cancer, colon cancer, colorectal cancer, ovarian cancer, cervical cancer, uterine cancer, endometrial cancer, bladder cancer, kidney cancer, virus-induced cancer, medulloblastoma, basal cell carcinoma, glioma, hepatocellular carcinoma, gastrointestinal stromal tumor (GIST), melanoma, primitive neuroectodermal tumor (PNT), fibrosarcoma, myxosarcoma, liposarcoma, chondrosarcoma, osteosarcoma, chordoma, endothelial sarcoma, lymphangiosarcoma, lymphohgioendothelioma, synovioma, mesothelioma, leiomyosarcoma, transitional cell carcinoma of the bladder, epithelial carcinoma, squamous cell carcinoma, adenocarcinoma, bronchogenic carcinoma, renal cell carcinoma and carcinoid tumors. PI3Kγ inhibitors also have therapeutic benefits for respiratory diseases, including asthma, cystic fibrosis, emphysema, chronic obstructive pulmonary disease (COPD), chronic bronchitis, bronchiectasis, acute respiratory distress syndrome, respiratory disease, chest disease, and pulmonary artery hypertension and so on.

At present, the only PI3Kγ selective inhibitor that has entered clinical research is Infinity's IPI-549, which can reverse tumor resistance to immune checkpoint inhibitors (such as PD-1 inhibitors and PD-L1 inhibitors), and shows potential in tumor immunotherapy. The structure of IPI-549 is shown below, and application WO2015051244A1 discloses the preparation method of IPI-549.

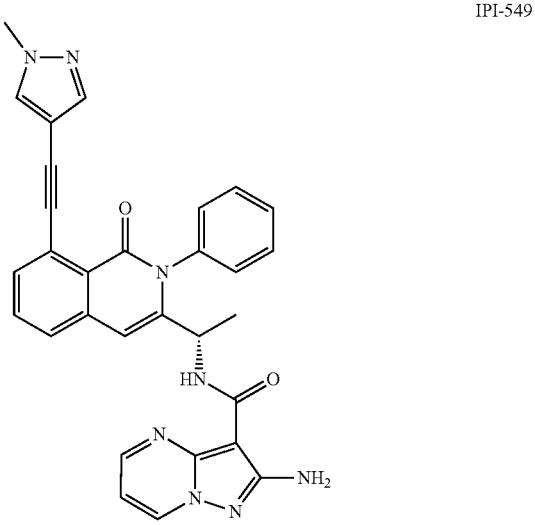 [SMILES: C[C@H](NC(=O)c1c(N)nn2cccnc12)c1cc2cccc(C#Cc3cnn(C)c3)c2c(=O)n1-c1ccccc1]

IPI-549

In addition, the prior art also discloses a series of PI3Kγ selective inhibitor applications, including WO2012052753, WO2011008302 and so on.

Although the research and application of PI3Kγ selective inhibitors have made certain progress, these new inhibitors are yet not mature, and there are still many problems to be solved, such as unsatisfactory biological activity, insufficient selectivity, high off-target risk, or insufficient safety and tolerance, and there is still huge room for improvement. It is still necessary to continue to research and develop new PI3Kγ selective inhibitors.

SUMMARY

In view of the above technical problems, the present invention provides an alkyne compound of formula (I) or a stereoisomer, a tautomer or a pharmaceutically acceptable salt thereof:

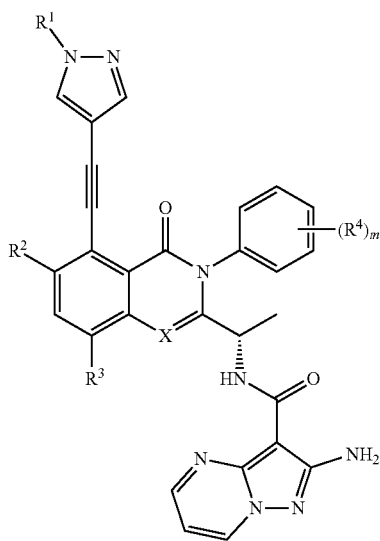

(I)

Wherein:

X is selected from CH or N;

$R^1$ is selected from cycloalkyl or heterocyclyl, wherein said cycloalkyl or heterocyclyl is optionally further substituted by one or more substituents selected from hydroxyl, halogen, nitro, cyano, alkyl, alkoxy, cycloalkyl, heterocyclyl, aryl, heteroaryl or —$NR^5R^6$; preferably, $R^1$ is selected from oxetanyl, cyclopropyl, cyclobutyl, cyclopentyl or cyclohexyl; more preferably cyclopropyl or oxetanyl;

$R^2$ and $R^3$ are each independently selected from hydrogen atom, alkyl, alkoxy, cyano or halogen, wherein the alkyl or alkoxy is optionally further substituted with one or more halogens;

$R^4$ is the same or different, each independently selected from hydrogen atom, alkyl, alkoxy, cyano or halogen, wherein the alkyl or alkoxy is optionally further substituted with one or more halogens;

$R^5$ and $R^6$ are each independently selected from hydrogen atom, alkyl or cycloalkyl, wherein the alkyl or cycloalkyl is optionally further substituted by one or more substituents selected from hydroxyl, halogen, cyano, alkyl, alkoxy, cycloalkyl or heterocyclyl; and m is 0, 1, 2, 3, 4, or 5.

In a preferred embodiment of the present invention, $R^1$ is preferably cyclopropyl, cyclobutyl, cyclopentyl, cyclohexyl or oxetanyl; more preferably cyclopropyl or oxetanyl.

In a preferred embodiment of the present invention, $R^2$ and $R^3$ are each independently selected from hydrogen atom or halogen, and the halogen is preferably fluorine.

In a preferred embodiment of the present invention, $R^4$ is the same or different, each independently selected from hydrogen atom, alkyl or halogen, and m is 0, 1, 2 or 3; preferably, $R^4$ is hydrogen atom.

In a preferred embodiment of the present invention, X is selected from CH or N, $R^1$ is selected from cyclopropyl or oxetanyl, and $R^2$ and $R^3$ are selected from hydrogen or F.

Typical compounds of the present invention include, but are not limited to:

| No. | Structure | Name |
|---|---|---|
| 1 |  | (S)-2-amino-N-(1-(8-((1-cyclopropyl-1H-pyrazol-4-yl)ethynyl)-1-oxo-2-phenyl-1,2-dihydroisoquinolin-3-yl)ethyl)pyrazolo[1,5-a]pyrimidine-3-carboxamide |

-continued

| No. | Structure | Name |
|---|---|---|
| 2 | | (S)-2-amino-N-(1-(5-((1-cyclopropyl-1H-pyrazol-4-yl)ethynyl)-4-oxo-3-phenyl-3,4-dihydroquinazolin-2-yl)ethyl)pyrazolo[1,5-a]pyrimidine-3-carboxamide |
| 3 | | (S)-2-amino-N-(1-(5-((1-cyclopropyl-1H-pyrazol-4-yl)ethynyl)-6-fluoro-4-oxo-3-phenyl-3,4-dihydroquinazolin-2-yl)ethyl)pyrazolo[1,5-a]pyrimidine-3-carboxamide |

-continued

| No. | Structure | Name |
|---|---|---|
| 4 | | (S)-2-amino-N-(1-(8-((1-(oxetan-3-yl)-1H-pyrazol-4-yl)ethynyl)-1-oxo-2-phenyl-1,2-dihydroisoquinolin-3-yl)ethyl)pyrazolo[1,5-a]pyrimidine-3-carboxamide | or the stereoisomer, tautomer, or pharmaceutically acceptable salt thereof.

Furthermore, the present disclosure provides a pharmaceutical composition comprising an effective dose of the compound of formula (I) or the stereoisomer, tautomer, or pharmaceutically acceptable salt thereof, and pharmaceutically acceptable carriers, excipients or combinations thereof.

The present disclosure provides use of the compound of formula (I) or the stereoisomer, tautomer, or pharmaceutically acceptable salt thereof according to the present disclosure, or the pharmaceutical composition thereof in the preparation of a medicament for phosphatidylinositol-3-kinase γ inhibitors.

The present invention provides a compound of formula (I) or the stereoisomer, tautomer, or pharmaceutically acceptable salt thereof, or a pharmaceutical composition thereof in preparation of a medicament for treatment of diseases mediated by phosphatidylinositol-3-kinase γ, wherein the diseases mediated by phosphatidylinositol-3-kinase γ are preferably cancer, bone disorders, respiratory diseases, inflammatory diseases or autoimmune diseases; wherein the respiratory disease is preferably asthma, cystic fibrosis, emphysema, chronic obstructive pulmonary disease, chronic bronchitis, bronchiectasis, acute respiratory distress syndrome, respiratory disease, chest disease, and pulmonary hypertension; wherein the cancer is preferably blood Tumors and solid tumors; wherein the hematological tumors are preferably selected from acute lymphocytic leukemia, chronic lymphocytic leukemia, prolymphocytic leukemia, hairy cell leukemia, Waldenstrom's macroglobulinemia, peripheral T cell lymphoma, adult T cell leukemia/lymphoma, cutaneous T cell lymphoma, large granular lymphocytic leukemia, acute myeloid leukemia, Hodgkin's lymphoma, non-Hodgkin's lymphoma, follicular lymphoma, diffuse large B cell lymphoma, mantle cell lymphoma, mastocytosis, multiple myeloma, myelodysplastic syndrome or myelodysplastic disorder; wherein the solid tumor is preferably selected from brain cancer, skin cancer, head and neck cancer, neuroendocrine cancer, pancreatic cancer, lung cancer, breast cancer, prostate cancer, testicular cancer, esophageal cancer, liver cancer, stomach cancer, colon cancer, colorectal cancer, ovarian cancer, cervical cancer, uterine cancer, endometrial cancer, bladder cancer, kidney cancer, virus-induced cancer, medulloblastoma, basal cell carcinoma, glioma, hepatocellular carcinoma, gastrointestinal stromal tumor, melanoma, primitive neuroectodermal tumor, fibrosarcoma, myxosarcoma, liposarcoma, chondrosarcoma, osteosarcoma, chordoma, endothelial sarcoma, lymphangiosarcoma, lymphohgioendothelioma, synovioma, mesothelioma, leiomyosarcoma, transitional cell carcinoma of the bladder, epithelial carcinoma, squamous cell carcinoma, adenocarcinoma, bronchogenic carcinoma, renal cell carcinoma and carcinoid tumors.

The present invention also provides use of the compound of formula (I) or the stereoisomer, tautomer, or pharmaceutically acceptable salt thereof, or the pharmaceutical composition thereof in combination with a second therapeutic agent in preparation of a medicament for treatment of diseases mediated by phosphatidylinositol-3-kinase γ, wherein the diseases mediated by phosphatidylinositol-3-kinase γ are preferably cancer, bone disorder, respiratory diseases, inflammatory disease or autoimmune disease; the respiratory disease is preferably asthma, cystic fibrosis, emphysema, chronic obstructive pulmonary disease, chronic bronchitis, bronchiectasis, acute respiratory distress syndrome, respiratory diseases, thoracic diseases, and pulmonary hypertension; the cancer is preferably hematological tumors and solid tumors; the hematological tumors are preferably selected from acute lymphocytic leukemia, chronic lymphocytic leukemia, prolymphocytic leukemia, hairy cell leukemia, Waldenstrom's macroglobulinemia, peripheral T cell lymphoma, adult T cell leukemia/lymphoma, cutaneous T cell lymphoma, large granular lymphocytic leukemia, acute myeloid leukemia, Hodgkin's lymphoma, non-Hodgkin's lymphoma tumor, follicular lymphoma, diffuse large B cell lymphoma, mantle cell lymphoma, mastocytosis, multiple myeloma, myelodysplastic syndrome or myelodysplastic disorder; the solid tumor is preferably selected from brain cancer, skin cancer, head and neck cancer, neuroendocrine cancer, pancreatic cancer, lung cancer, breast cancer, prostate cancer, testicular cancer, esophageal cancer, liver cancer, stomach cancer, colon cancer, colorectal cancer, ovarian cancer, cervical cancer, uterine cancer, endometrial cancer, bladder cancer, kidney cancer, virus-induced cancer, medulloblastoma, basal cell carcinoma, glioma, hepatocellular carcinoma, gastrointestinal stromal tumor, melanoma, primitive neuroectodermal tumor, fibrosarcoma, myxosarcoma, liposarcoma, chondrosarcoma, osteosarcoma, chordoma, endothelial sarcoma, lymphangiosarcoma, lymphohgioendothelioma, synovioma, mesothelioma, leiomyosarcoma, transitional cell carcinoma of the bladder, epithelial carcinoma, squamous cell carcinoma, adenocarcinoma, bronchogenic carcinoma, renal cell carcinoma and carcinoid tumors; wherein the second therapeutic agent is selected from PI3Kδ inhibitors, mTOR inhibitors, costimulatory modulators, immunostimulators, CXCL12/CXCR4 inhibitors, MAC inhibitors, proteasome inhibitors, CD28 antibodies, CD30 antibodies, CD40 antibodies, GM-CSF, gemcitabine, cyclophosphamide, docetaxel, paclitaxel, 5-FU, temozolomide, anti-angiogenesis agent, axitinib, PD-1 inhibitors, PD-L1 inhibitors or mixture thereof; preferably PD-1 inhibitors or PD-L1 inhibitors.

The present invention provides a method for inhibiting the activity of phosphatidylinositol-3-kinase γ, comprising administering the compound of formula (I) or the stereoisomer, tautomer, or pharmaceutically acceptable salt thereof, or a pharmaceutical composition thereof.

The present invention provides a method for treating cancer, bone disorders, respiratory diseases, inflammatory diseases or autoimmune diseases by inhibiting the activity of phosphatidylinositol-3-kinase γ, comprising administering to a patient in need thereof the compound of formula (I) or the stereoisomer, tautomer, or pharmaceutically acceptable salt thereof or pharmaceutical compositions thereof; wherein the respiratory disease is preferably selected from asthma, cystic fibrosis, emphysema, chronic obstruction pulmonary disease, chronic bronchitis, bronchiectasis, acute respiratory distress syndrome, respiratory disease, chest disease and pulmonary hypertension; the cancer is preferably hematological tumor and solid tumor; wherein the hematological tumor is preferably selected from acute lymphocytic leukemia, chronic lymphocytic leukemia, prolymphocytic leukemia, hairy cell leukemia, Waldenstrom's macroglobulinemia, peripheral T cell lymphoma, adult T cell leukemia/lymphoma, cutaneous T cell lymphoma, large granular lymphocytic leukemia, acute myeloid leukemia, Hodgkin's lymphoma, non-Hodgkin's lymphoma, follicular lymphoma, diffuse large B cell lymphoma, mantle cell lymphoma, mastocytosis, multiple myeloma, myelodysplastic syndrome or myelodysplastic disorder; wherein the solid tumor is preferably selected from brain cancer, skin cancer, head and neck cancer, neuroendocrine cancer, pancreatic cancer, lung cancer, breast cancer, prostate cancer, testicular cancer, esophageal cancer, liver cancer, stomach cancer, colon cancer, colorectal cancer, ovarian cancer, cervical cancer, uterine cancer, endometrial cancer, bladder cancer, kidney cancer, virus-induced cancer, medulloblastoma, basal cell carcinoma, glioma, hepatocellular carcinoma, gastrointestinal stromal tumor, melanoma, primitive neuroectodermal tumor, fibrosarcoma, myxosarcoma, liposarcoma, chondrosarcoma, osteosarcoma, chordoma, endothelial sarcoma, lymphangiosarcoma, lymphangiendothelioma, synovioma, mesothelioma, leiomyosarcoma, transitional cell carcinoma of the bladder, epithelial carcinoma, squamous cell carcinoma, adenocarcinoma, bronchogenic carcinoma, renal cell carcinoma, and carcinoid tumors.

In some preferred embodiments, the above-mentioned method for treating cancer, bone disorder, respiratory disease, inflammatory disease or autoimmune disease further comprises additionally administering one or more second therapeutic agents to said patient, wherein said respiratory disease is preferably selected from asthma, cystic fibrosis, emphysema, chronic obstructive pulmonary disease, chronic bronchitis, bronchiectasis, acute respiratory distress syndrome, respiratory disease, chest disease, and pulmonary hypertension; wherein the cancer is preferably from hematological tumors and solid tumors; wherein the hematological tumors are preferably selected from acute lymphocytic leukemia, chronic lymphocytic leukemia, prolymphocytic leukemia, hairy cell leukemia, Waldenstrom's macroglobulinemia, peripheral T cell lymphoma, adult T cell Leukemia/lymphoma, cutaneous T cell lymphoma, large granular lymphocytic leukemia, acute myeloid leukemia, Hodgkin's lymphoma, non-Hodgkin's lymphoma, follicular lymphoma, diffuse large B cell lymphoma, mantle cell lymphoma, mastocytosis, multiple myeloma, myelodysplastic syndrome or myelodysplastic disorder; wherein the solid tumor is preferably selected from brain cancer, skin cancer, head and neck cancer, neuroendocrine cancer, pancreatic cancer, lung cancer, breast cancer, prostate cancer, testicular cancer, esophageal cancer, liver cancer, stomach cancer, colon cancer, colorectal cancer, ovarian cancer, cervical cancer, uterine cancer, endometrial cancer, bladder cancer, kidney cancer, virus-induced cancer, medulloblastoma, basal cell carcinoma, glioma, hepatocellular carcinoma, gastrointestinal stromal tumor, melanoma, primitive neuroectodermal tumor, fibrosarcoma, myxosarcoma, liposarcoma, chondrosarcoma, osteosarcoma, chordoma, endothelial sarcoma, lymphangiosarcoma, lymphohgioendothelioma, synovioma, mesothelioma, leiomyosarcoma, transitional cell carcinoma of the bladder, epithelial carcinoma, squamous cell carcinoma, adenocarcinoma, bronchogenic carcinoma, renal cell carcinoma and carcinoid tumors; wherein the second therapeutic agent is selected from PI3Kδ inhibitors, mTOR inhibitors, costimulatory modifiers, immunostimulators, CXCL12/CXCR4 inhibitors, HDAC inhibitors, proteasome inhibitors, CD28 antibodies, CD30 antibodies, CD40 antibodies, GM-CSF, gemcitabine, cyclophosphamide, docetaxel, paclitaxel, 5-FU, temozolomide, anti-angiogenesis agent, axitinib, PD-1 inhibitors, PD-L1 inhibitors and mixtures thereof; preferably PD-1 inhibitors or PD-L1 inhibitors.

DETAILED DESCRIPTION

Unless stated to the contrary, some terms used in the specification and claims of the present invention are defined as follows:

When "alkyl" is regarded as a group or a part of a group, it refers to $C_1$-$C_{20}$ straight chain or branched aliphatic hydrocarbon groups, preferably $C_1$-$C_{10}$ alkyl group, more preferably $C_1$-$C_6$ alkyl group, and $C_1$-$C_4$ alkyl group. Examples of alkyl groups include, but are not limited to, methyl, ethyl, n-propyl, isopropyl, n-butyl, isobutyl, tert-butyl, sec-butyl, n-pentyl, 1,1-dimethylpropyl, 1,2-dimethylpropyl, 2,2-dimethylpropyl, 1-ethylpropyl, 2-methylbutyl, 3-methylbutyl, n-hexyl, 1-ethyl-2-methylpropyl, 1,1,2-trimethylpropyl, 1,1-dimethylbutyl, 1,2-dimethylbutyl, 2,2-dimethylbutyl, 1,3-dimethylbutyl, 2-ethylbutyl, 2-methylpentyl, 3-methylpentyl, 4-methylpentyl, 2,3-dimethylbutyl and so on. Alkyl groups can be substituted or unsubstituted.

"Cycloalkyl" refers to saturated or partially saturated monocyclic, fused, bridged, and spirocyclic carbocycles. It is preferably $C_3$-$C_{12}$ cycloalkyl, more preferably $C_3$-$C_8$ cycloalkyl, and most preferably $C_3$-$C_6$ cycloalkyl. Examples of monocyclic cycloalkyl groups include, but are not limited to, cyclopropyl, cyclobutyl, cyclopentyl, cyclopentenyl, cyclohexyl, cyclohexenyl, cyclohexadienyl, cycloheptyl, cycloheptatrienyl, cyclooctyl, and the like, preferably cyclopropyl, cyclohexenyl. The cycloalkyl ring may be fused to aryl, heteroaryl or heterocyclyl ring, wherein the ring connected to the parent structure is a cycloalkyl group, non-limiting examples include indanyl, tetralyl, benzocycloheptyl and so on. The cycloalkyl group can be optionally substituted or unsubstituted.

"Heterocyclyl" or "heterocyclic ring" are used interchangeably in this application, and both refer to non-aromatic heterocyclyl, in which one or more ring-forming atoms are heteroatoms, such as oxygen, nitrogen, sulfur atoms and so on, including single rings, fused rings, bridged rings and spiro rings. They preferably have a 5- to 7-membered monocyclic ring or a 7- to 10-membered bi- or tricyclic ring, which may contain 1, 2 or 3 atoms selected from nitrogen, oxygen and/or sulfur. Examples of "heterocyclyl" include, but are not limited to, morpholinyl, oxetanyl, thiomorpholinyl, tetrahydropyranyl, 1,1-dioxo-thiomorpholinyl, piperidinyl, 2-oxo-piperidinyl, pyrrolidinyl, 2-oxo-pyrrolidinyl, piperazin-2-one, 8-oxa-3-aza-bicyclo[3.2.1]octyl and piperazinyl. Heterocyclyl may be substituted or unsubstituted. The heterocyclic ring may be fused to aryl, heteroaryl or cycloalkyl ring, wherein the ring connected to the parent structure is a heterocyclic group. The heterocyclic group may be optionally substituted or unsubstituted.

"Aryl" refers to a carbocyclic aromatic system containing one or two rings, wherein the rings can be joined together in a fused manner. The term "aryl" includes aromatic groups such as phenyl, naphthyl, and tetrahydronaphthyl. Preferably, the aryl group is $C_6$-$C_{10}$ aryl, more preferably phenyl or naphthyl, and most preferably phenyl. Aryl may be substituted or unsubstituted. The "aryl" can be fused with heteroaryl, heterocyclyl or cycloalkyl, wherein the ring connected to the parent structure is aryl ring. Non-limiting examples include but are not limited to:

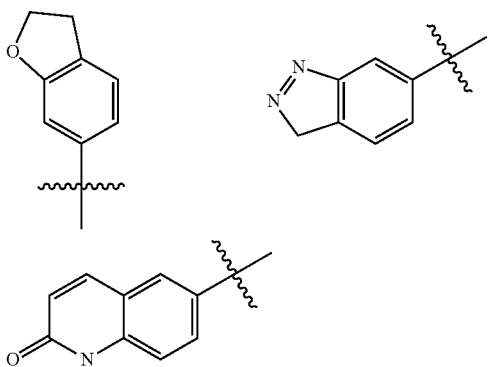

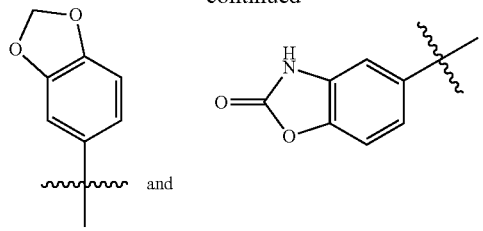

and

"Heteroaryl" refers to an aromatic 5- to 6-membered monocyclic ring or 8- to 10-membered bicyclic ring, which may contain 1, 2, 3, or 4 atoms selected from nitrogen, oxygen, and/or sulfur. Examples of "heteroaryl" include, but are not limited to, furyl, pyridyl, 2-oxo-1,2-dihydropyridyl, pyridazinyl, pyrimidinyl, pyrazinyl, thienyl, isoxazolyl, oxazolyl, oxadiazolyl, imidazolyl, pyrrolyl, pyrazolyl, triazolyl, tetrazolyl, thiazolyl, isothiazolyl, 1,2,3-thiadiazolyl, benzodioxolyl, benzothienyl, benzimidazolyl, indolyl, isoindolyl, 1,3-dioxo-isoindolyl, quinolinyl, indazolyl, benzisothiazolyl, benzoxazolyl and benzisoxazolyl. Heteroaryl may be substituted or unsubstituted.

"Alkoxy" refers to (alkyl-O—) groups, wherein alkyl is defined as above. $C_1$-$C_6$ alkoxy and $C_1$-$C_4$ alkoxy are preferred. Examples thereof include, but are not limited to: methoxy, ethoxy, n-propoxy, isopropoxy, n-butoxy, isobutoxy, tert-butoxy and the like.

"Hydroxy" refers to —OH group.
"Halogen" refers to fluoro, chlorine, bromine and iodine.
"Amino" refers to —$NH_2$.
"Cyano" refers to —CN.
"Nitro" refers to —$NO_2$.
"Carboxyl" refers to —C(O)OH.
"Carboxylic ester groups" refers to —C(O)O-alkyl or —C(O)O-cycloalkyl, wherein alkyl, cycloalkyl are defined as above.
"DMSO" refers to dimethyl sulfoxide.
"Me" refers to methyl.
"Et" refers to ethyl.
"TMS" refers to trimethylsilyl.

"Substituted" refers to one or more hydrogen atoms in the group, preferably up to 5, and more preferably 1, 2, or 3 hydrogen atoms are each independently substituted with a corresponding number of substituents. It goes without saying that the substituents are only in their possible chemical positions, and those skilled in the art can determine (using experiment or theory) possible or impossible substitutions without too much effort. For example, an amino group or a hydroxyl group having free hydrogen may be unstable when combined with a carbon atom having an unsaturated (e.g., olefinic) bond.

Unless otherwise specified, the "substitution" or "substituted" in this specification means that the group may be substituted by one or more groups selected from the following: alkyl, alkenyl, alkynyl, alkoxy, alkylthio, alkylamino, halogen, mercapto, hydroxyl, nitro, cyano, cycloalkyl, heterocyclyl, aryl, heteroaryl, cycloalkoxy, heterocycloalkoxy, cycloalkylthio, heterocycloalkylthio, amino, haloalkyl, hydroxyalkyl, carboxyl, carboxylic ester groups, =O and —$NR^5R^6$;

$R^5$ and $R^6$ are each independently selected from hydrogen atom, alkyl or cycloalkyl, wherein the alkyl or cycloalkyl is optionally further substituted with one or more substituents selected from hydroxyl, halogen, cyano, alkyl, alkoxy, cycloalkyl or heterocyclyl. Particularly preferably, $R^5$ and $R^6$ are each independently selected from hydrogen atoms.

"Pharmaceutically acceptable salts" refer to certain salts of the above-mentioned compounds capable of maintaining their original biological activity and being suitable for medical use. The pharmaceutically acceptable salt of the compound represented by formula (I) may be an ammonium salt formed with a suitable acid.

"Pharmaceutical composition" means a mixture containing one or more of the compounds described herein or their pharmaceutically acceptable salts or prodrugs and other chemical components, and other components such as physiologically pharmaceutically acceptable carriers and excipients. The purpose of the pharmaceutical composition is to promote the administration to the organism, facilitate the absorption of the active ingredients to exert their biological activity.

In the present invention, the term "plurality" means more than one in number, for example, two, three, four or more.

DETAILED DESCRIPTION

The following examples are given to further describe the present disclosure, rather than to limit the scope of the present disclosure.

EXAMPLES

Examples show the preparation of representative compounds of formula (I) and related structural identification data. It should be noted that the following examples are used to illustrate, rather than to limit, the present disclosure. The $^1$H NMR spectrum was measured with a Bruker instrument (400 MHz), and the chemical shift was expressed in ppm. Tetramethylsilane was used as internal standard (0.00 ppm). $^1$H NMR was expressed in a way of: s=singlet, d=doublet, t=triplet, m=multiplet, br=broadened, dd=doublet of doublet, dt=doublet of triplet. If the coupling constant is provided, its unit is Hz.

Mass spectrum was measured by an LC/MS instrument, and ionization was carried out in a manner of ESI or APCI.

Yantai Huanghai HSGF254 or Qingdao GF254 silica gel plate was used as thin layer chromatography silica gel plate, the silica gel plate used in thin-layer chromatography (TLC) had a specification of 0.15 mm-0.2 mm, and the specification used for thin layer chromatography separation and purification products was 0.4 mm-0.5 mm.

In column chromatography, Yantai Huanghai silica gel 200-300 mesh silica gel was generally used as a carrier.

In the following examples, unless otherwise specified, all temperatures are expressed in degrees Celsius. Unless otherwise specified, starting materials and reagents are all commercially available or synthesized according to known methods. The commercially available raw materials and reagents were all used directly without further purification. Unless otherwise specified, manufacturers included, but were not limited to, Aldrich Chemical Company, ABCR GmbH & Co. KG, Acros Organics, Guangzan Chemical Technology Co., Ltd. and Jingyan Chemical Technology Co., Ltd.

CD$_3$OD: deuterated methanol.
CDCl$_3$: deuterated chloroform.
DMSO-d$_6$: deuterated dimethyl sulfoxide.

Argon atmosphere refers to the reaction flask connected with an argon balloon having a volume of about 1 L.

In the examples, unless otherwise specified, the solution in the reaction refers to an aqueous solution.

The compounds were purified by using a silica gel column chromatography eluent system and thin layer chromatography. The eluent systems were selected from: petroleum ether-ethyl acetate system A; dichloromethane-methanol system B; and dichloromethane-ethyl acetate system C, in which the volume ratio of the solvent varies according to the compound polarity and may be adjusted by adding a small amount of acidic or alkaline reagents, such as acetic acid or triethylamine, and the like.

Example 1

(S)-2-amino-N-(1-(8-((1-cyclopropyl-1H-pyrazol-4-yl)ethynyl)-1-oxo-2-phenyl-1,2-dihydroisoquinolin-3-yl)ethyl)pyrazolo[1,5-a]pyrimidine-3-carboxamide

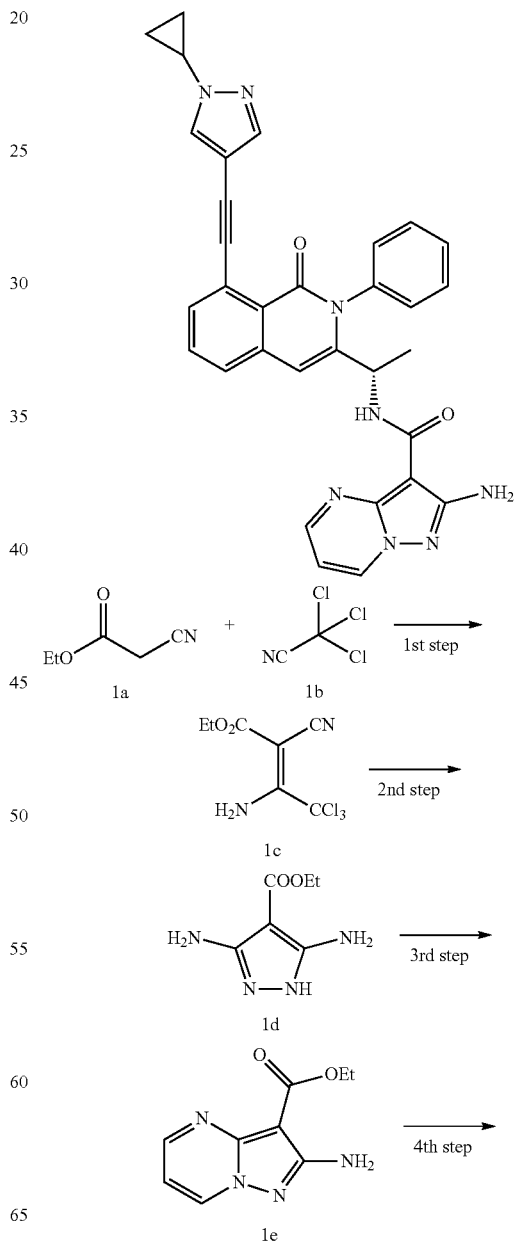

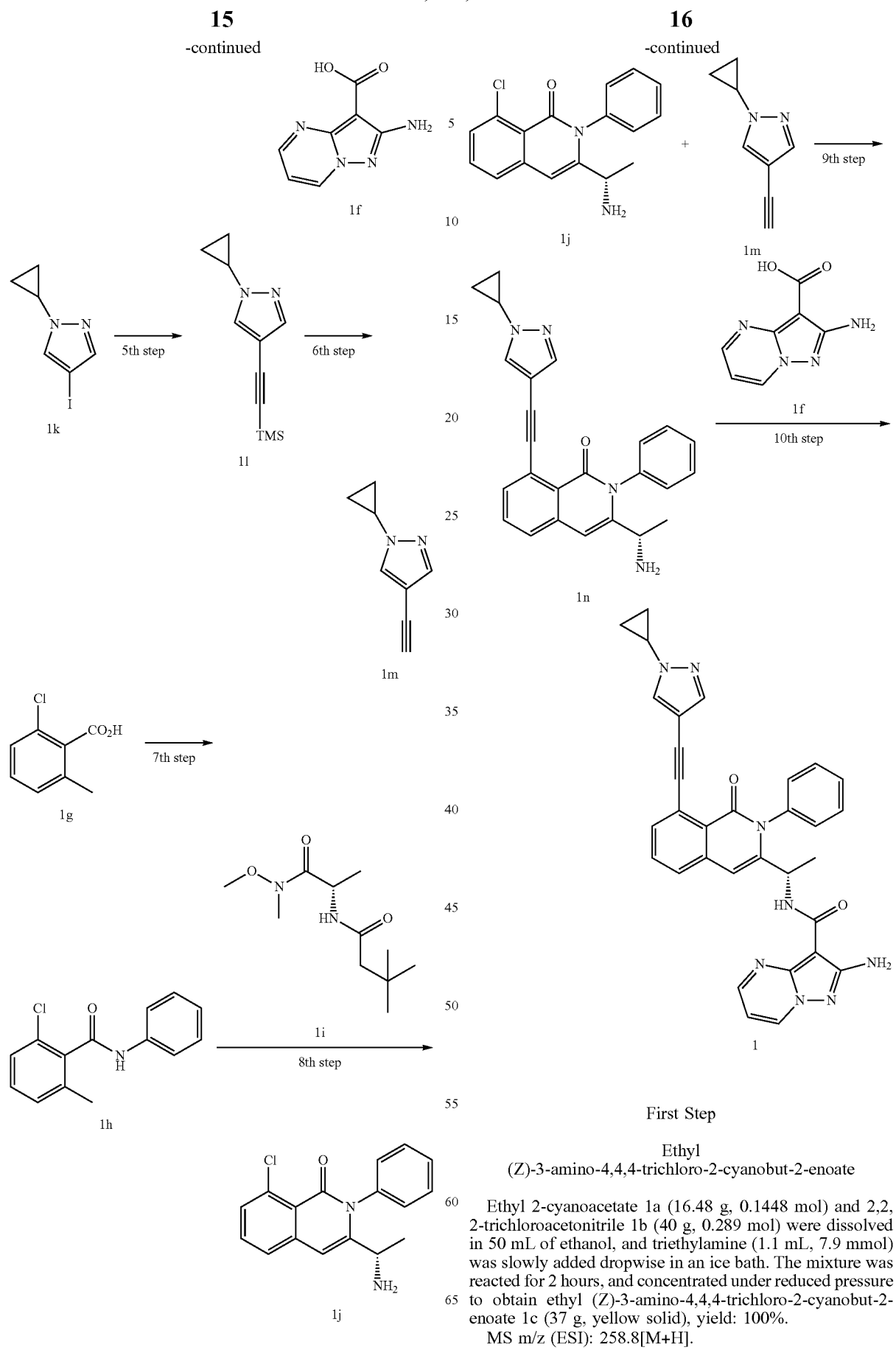

First Step

Ethyl (Z)-3-amino-4,4,4-trichloro-2-cyanobut-2-enoate

Ethyl 2-cyanoacetate 1a (16.48 g, 0.1448 mol) and 2,2,2-trichloroacetonitrile 1b (40 g, 0.289 mol) were dissolved in 50 mL of ethanol, and triethylamine (1.1 mL, 7.9 mmol) was slowly added dropwise in an ice bath. The mixture was reacted for 2 hours, and concentrated under reduced pressure to obtain ethyl (Z)-3-amino-4,4,4-trichloro-2-cyanobut-2-enoate 1c (37 g, yellow solid), yield: 100%.

MS m/z (ESI): 258.8[M+H].

Second Step

Ethyl 3,5-diamino-1H-pyrazol-4-carboxylate

Ethyl (Z)-3-amino-4,4,4-trichloro-2-cyanobut-2-enoate 1c (37 g, 0.1448 mmol) and hydrazine hydrate (18 g, 0.362 mol) were dissolved in 75 mL of N,N-dimethylformamide. The mixture was heated to 100° C. and reacted for 3 hours, and concentrated under reduced pressure. The obtained residue was further separated and purified by silica gel column chromatography (eluent: system B) to obtain ethyl 3,5-diamino-1H-pyrazol-4-carboxylate 1d (24.6 g, yellow solid), yield: 100%.

MS m/z (ESI):171.1[M+H]

Third Step

Ethyl 2-aminopyrazolo[1,5-a]pyrimidine-3-carboxylate

Ethyl 3,5-diamino-1H-pyrazol-4-carboxylate 1d (23.5 g, 0.138 mol) and 1,1,3,3-tetramethyloxypropane (24.9 g, 0.152 mol) were added to 140 mL of 2M hydrochloric acid. The mixture was heated to 50° C. and reacted for 2 hours. The mixture was cooled to room temperature, adjusted pH to 9 with ammonia water, extracted with dichloromethane (200 mL×3). The organic phases were combined, and concentrated under reduced pressure to obtain ethyl 2-aminopyrazolo[1,5-a]pyrimidine-3-carboxylate 1e (15.2 g, yellow solid), yield: 53.5%.

MS m/z (ESI): 206.9[M+H]

Fourth Step

2-aminopyrazolo[1,5-a]pyrimidine-3-methanoic Acid

Ethyl 2-aminopyrazolo[1,5-a]pyrimidine-3-carboxylate 1e (16.7 g, 0.081 mol) and lithium hydroxide monohydrate (14.98 g, 0.356 mol) were added to 150 mL of a mixed solvent of methanol and water (V/V=1:4). The mixture was heated to 50° C. and reacted for 2 hours, concentrated under reduced pressure, and adjusted pH to 6 with 4M hydrochloric acid. The solid was washed out, filtered and dried to obtain 2-aminopyrazolo[1,5-a]pyrimidine-3-methanoic acid if (7.8 g, yellow solid), yield: 54%.

MS m/z (ESI): 178.9[M+H]

Fifth Step

1-cyclopropyl-4-((trimethylsilyl)ethynyl)-1H-pyrazole

Under the protection of argon gas, 1-cyclopropyl-4-iodo-1H-pyrazole 1k (28 g, 0.12 mol, prepared according to application "WO2015134701") was dissolved in 500 mL of tetrahydrofuran, and bistriphenylphosphonium palladium dichloride (4.2 g, 0.006 mol), cuprous iodide (2.28 g, 0.012 mol) and 0.6 mL triethylamine were added thereto. The temperature was controlled at 0° C., and ethynyltrimethylsilane (23.5 g, 0.24 mol) was slowly added. The mixture was reacted overnight at room temperature, and filtered. The filtrate was concentrated under reduced pressure. The obtained residue was further separated and purified by silica gel column chromatography (eluent: system A) to obtain 1-cyclopropyl-4-((trimethylsilyl)ethynyl)-1H-pyrazole 11 (20.5 g, brown-black liquid), yield: 83.7%.

MS m/z (ESI): 205.1[M+H]

Sixth Step

1-cyclopropyl-4-ethynyl-1H-pyrazole

1-Cyclopropyl-4-((trimethylsilyl)ethynyl)-1H-pyrazole 11 (20.5 g, 0.1 mol) was dissolved in 120 mL of tetrahydrofuran. The temperature was controlled at 0° C. Tetrabutylammonium fluoride in tetrahydrofuran (120 mL, 0.12 mol, 1 mol/L) was added thereto. The mixture was reacted at room temperature for 1 hour, and concentrated under reduced pressure. The obtained residue was further separated and purified by silica gel column chromatography (eluent: system A) to obtain 1-cyclopropyl-4-ethynyl-1H-pyrazole 1m (12 g, light yellow liquid), yield: 90.9%.

MS m/z (ESI): 133.1[M+H]

Seventh Step

2-Chloro-6-methyl-N-phenylbenzamide 2-chloro-6-methylbenzoic acid 1 g (17 g, 0.1 mol) was dissolved in 100 mL of dichloromethane. 0.2 mL of N,N-dimethylformamide was added dropwise, and oxalyl chloride (9.3 mL, 0.11 mol) was added slowly dropwise under ice bath. The mixture was reacted at room temperature for 3 hours, and concentrated under reduced pressure. The residue was dissolved in 70 mL of dichloromethane. Under ice bath, 100 mL dichloromethane solution dissolved with aniline (9.76 g, 0.105 mol) and triethylamine (30 mL, 0.210 mol) was slowly added dropwise, and the mixture was reacted at room temperature for 2 hours. 100 mL of water and 100 mL of dichloromethane were added. The mixture was dried with anhydrous sodium sulfate, and concentrated under reduced pressure. The mixture was added with 20 mL of ethyl acetate and 200 mL of n-hexane, and stirred. Solid was precipitated, filtered and dried to obtain 2-chloro-6-methyl-N-phenylbenzamide 1 h (18.9 g, yellow solid), yield: 77.14%.

MS m/z (ESI): 246.0[M+H]

Eighth Step

(S)-3-(1-aminoethyl)-8-chloro-2-phenylisoquinolin-1(2H)-one

2-Chloro-6-methyl-N-phenylbenzamide 1 h (490 mg, 2 mmol) was added to 5 mL of tetrahydrofuran. The temperature was controlled at −30° C. N-butyllithium (2.5 mL, 5 mmol) was added slowly dropwise. The mixture was reacted for half an hour at this temperature. At the same time, tert-butyl (S)-(1-(methoxy(methyl)amino)-1-oxopropyl-2-yl)carbamate 1i (696 mg, 3 mmol, prepared according to J. Med. Chem. 2003, 43, 3434-3442) was added to 5 mL of tetrahydrofuran, the temperature was controlled at −30° C., isopropylmagnesium chloride (1.65 mL, 3.3 mmol) was slowly added dropwise. The mixture was reacted at this temperature for 0.5 hours. The temperature was controlled at −15° C., and the reaction solution 1i was slowly added dropwise to the reaction solution 1h and reacted for 1 hour. The reaction solution was quenched by adding 1 mL of water, adjusted pH to 2 with concentrated hydrochloric acid, and concentrated under reduced pressure. The residue was dissolved in 10 mL of methanol, and 5 mL of concentrated hydrochloric acid was added. The mixture was heated to reflux for 1 hour, concentrated under reduced pressure, and extracted twice with 200 mL of a mixed solvent of ethyl acetate and petroleum ether (V/V=1:1). The aqueous phase was adjusted to pH=10 with ammonia water, and extracted with 100 mL of dichloromethane. The dichloromethane layer was concentrated under reduced pressure. The residue was separated by preparative liquid phase to obtain (S)-3-(1-aminoethyl)-8-chloro-2-phenylisoquinolin-1(2H)-one 1j (300 mg, light yellow solid), yield: 50%.

MS m/z (ESI): 299.0[M+H]

Ninth Step (S)-3-(1-aminoethyl)-8-((1-cyclopropyl-1H-pyrazol-4-yl)ethynyl)-2-phenylisoquinolin-1(2H)-one Under the protection of argon gas, the (S)-3-(1-aminoethyl)-8-chloro-2-phenylisoquinolin-1(2H)-one 1j (200 mg, 0.67 mmol), bisacetonitrile palladium dichloride (34 mg, 0.132 mmol), cesium carbonate (659 mg, 2.01 mmol), 2-dicyclohexylphosphorus-2,4,6-triisopropylbiphenyl (95 mg, 0.2 mmol) and 1-cyclopropyl-4-ethynyl-1H-pyrazole 1m (174 mg, 1.32 mmol) were added to 10 mL of acetonitrile, heated to 75° C. The mixture was reacted for 4 hours, and concentrated under reduced pressure. Dichloromethane was added. The mixture was filtered with celite, washed with water. The organic phases were combined, dried with anhydrous sodium sulfate, concentrated, and separated by thin layer preparation to obtain (S)-3-(1-aminoethyl)-8-((1-cyclopropyl-1H-pyrazol-4-yl)ethynyl)-2-phenylisoquinolin-1(2H)-one 1n (120 mg, yellow solid), yield: 45%.

MS m/z (ESI): 394.9[M+H]

Tenth Step (S)-2-amino-N-(1-(8-((1-cyclopropyl-1H-pyrazol-4-yl)ethynyl)-1-oxo-2-phenyl-1,2-dihydroisoquinolin-3-yl)ethyl)pyrazolo[1,5-a]pyrimidine-3-carboxamide Under the protection of argon gas, (S)-3-(1-aminoethyl)-8-((1-cyclopropyl-1H-pyrazol-4-yl)ethynyl)-2-phenylisoquinolin-1(2H)-one 1n (120 mg, 0.304 mmol), 2-aminopyrazolo[1,5-a]pyrimidine-3-carboxylic acid 1f (56.92 mg, 0.319 mmol), 1-(3-dimethylamino)propyl)-3-ethylcarbodiimide hydrochloride (69.93 mg, 0.364 mmol), 1-hydroxybenzotriazole (4 mg, 0.0304 mmol), N,N-diisopropylethylamine (0.16 mL, 0.912 mmol) were dissolved in 3 mL of N,N-dimethylformamide and the mixture was reacted at room temperature overnight. Cold potassium carbonate solution (10 mL, 0.1 mol) was slowly added. The mixture was filtered, washed with water, dried with anhydrous sodium sulfate. The filtrate was concentrated, and separated by thin layer preparation to obtain (S)-2-amino-N-(1-(8-((1-cyclopropyl-1H-pyrazol-4-yl)ethynyl)-1-oxo-2-phenyl-1,2-dihydroisoquinolin-3-yl)ethyl) pyrazolo[1,5-a]pyrimidine-3-carboxamide 1 (70 mg), yield: 41.6%.

MS m/z (ESI): 554.9[M+H].

$^1$H NMR (400 MHz, DMSO-$d_6$) δ ppm 8.93 (d, J=6.7 Hz, 1H), 8.55 (d, J=4.6 Hz, 1H), 8.09 (s, 1H), 8.00 (d, J=6.6 Hz, 1H), 7.54-7.67 (m, 5H), 7.43-7.53 (m, 3H), 7.34-7.41 (m, 1H), 7.02 (dd, J=6.7, 4.5 Hz, 1H), 6.74 (s, 1H), 6.43 (brs, 2H), 4.55 (t, J=6.7 Hz, 1H) 3.72 (dq, J=7.5, 3.8 Hz, 1H), 1.35 (d, J=6.7 Hz, 3H), 1.01-1.08 (m, 2H), 0.90-0.98 (m, 2H).

Example 2

(S)-2-amino-N-(1-(5-((1-cyclopropyl-1H-pyrazol-4-yl)ethynyl)-4-oxo-3-phenyl-3,4-dihydroquinazolin-2-yl)ethyl)pyrazolo[1,5-a]pyrimidine-3-carboxamide

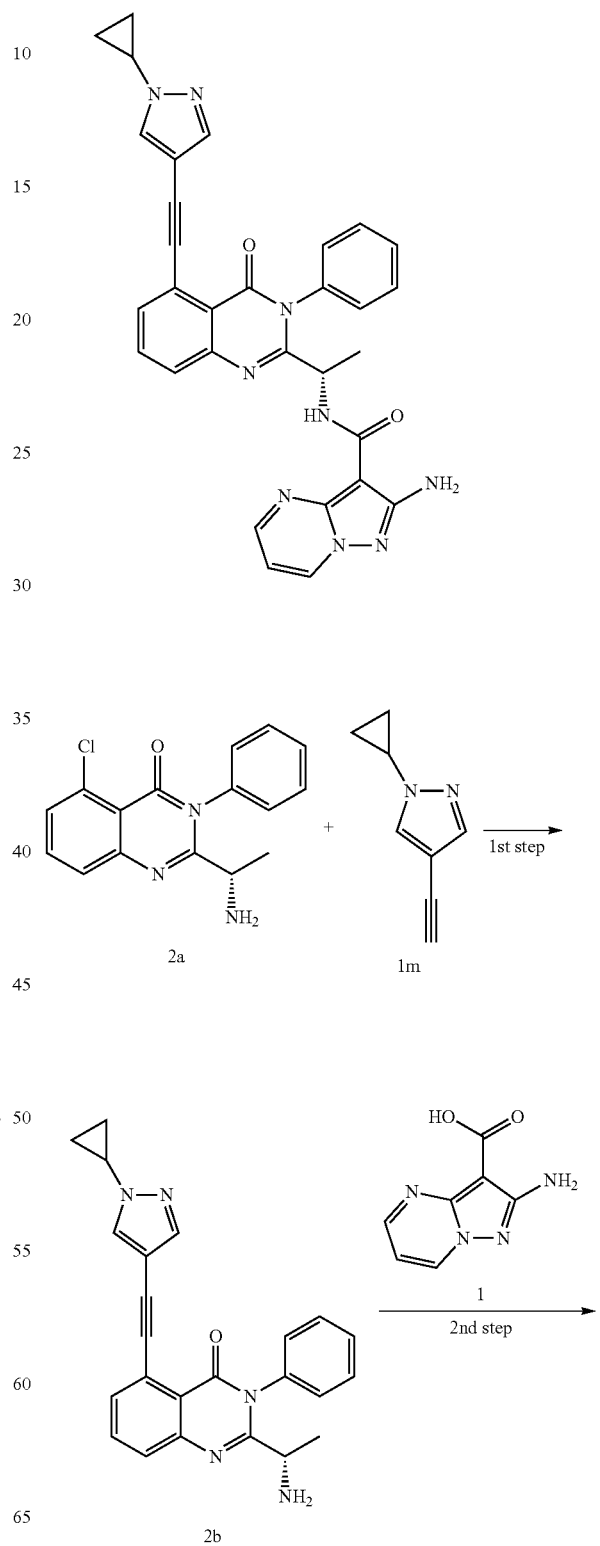

-continued

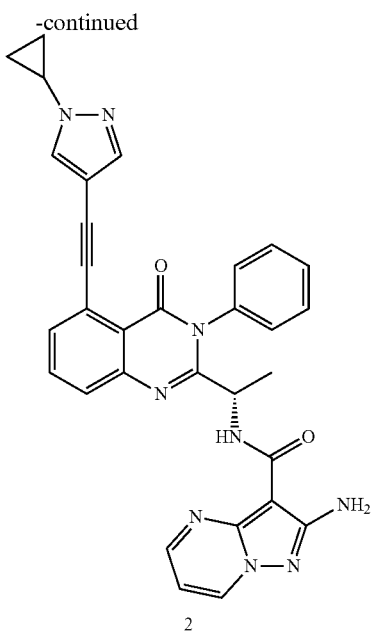

2

First Step (S)-2-(1-aminoethyl)-5-((1-cyclopropyl-1H-pyrazol-4-yl)ethynyl)-3-phenylquinazolin-4 (3H)-one Under the protection of argon gas, (S)-2-(1-aminoethyl)-5-chloro-3-phenylquinazolin-4(3H)-one 2a (5 g, 16.7 mmol, prepared according to US20180105527), bisacetonitrile palladium dichloride (217 mg, 0.835 mmol), cesium carbonate (16.3 g, 50.1 mmol), 2-dicyclohexylphosphorus-2,4,6-triisopropylbiphenyl (796 mg, 1.67 mmol) and 1-cyclopropyl-4-ethynyl-1H-pyrazole 1m (2.9 g, 21.7 mmol) were added to 100 mL of acetonitrile. The mixture was heated to 85° C., reacted for 5 hours, and concentrated under reduced pressure. Dichloromethane was added. The mixture was filtered with celite, washed with water. The organic phases was combined, dried with anhydrous sodium sulfate, and concentrated. The obtained residue was further separated and purified by silica gel column chromatography (eluent: system B) to obtain (S)-2-(1-aminoethyl)-5-((1-cyclopropyl-1H-pyrazol-4-yl)ethynyl)-3-phenylquinazolin-4(3H)-one 2b (5.2 g), yield: 78.8%.

MS m/z (ESI): 396.1 [M+H]

Second Step (S)-2-amino-N-(1-(5-((1-cyclopropyl-1H-pyrazol-4-yl)ethynyl)-4-oxo-3-phenyl-3,4-dihydroquinazolin-2-yl)ethyl)pyrazolo[1,5-a]pyrimidine-3-carboxamide Under the protection of argon gas, (S)-2-(1-aminoethyl)-5-((1-cyclopropyl-1H-pyrazol-4-yl)ethynyl)-3-phenylquinazolin-4(3H)-one 2b (25.6 g, 64.7 mmol), 2-aminopyrazolo[1,5-a]pyrimidine-3-carboxylic acid 1f (13.8 g, 77.5 mmol), 1-(3-dimethylaminopropyl)-3-ethylcarbodiimide hydrochloride (18.6 g, 97.05 mmol), 1-hydroxybenzotriazole (4.37 g, 32.3 mmol), N,N-diisopropylethylamine (17 g, 129.4 mmol) were dissolved in 300 mL of N,N-dimethylformamide. The mixture was reacted at 40° C. for 3 hours, and concentrated under reduced pressure. 500 mL of water was added. The mixture was extracted with ethyl acetate (500 mL×3). The organic phases were combined, and washed with 500 mL of saturated sodium chloride solution. The obtained residue was further separated and purified by silica gel column chromatography (eluent: system B) to obtain (S)-2-amino-N-(1-(5-((1-cyclopropyl-1H-pyrazol-4-yl)ethynyl)-4-oxo-3-phenyl-3,4-dihydroquinazolin-2-yl)ethyl)pyrazolo[1,5-a]pyrimidine-3-carboxamide 2 (21.3 g), yield: 59.2%.

MS m/z (ESI): 556.2 [M+H]

$^1$H NMR (400 MHz, DMSO-d$_6$) δ ppm 8.91 (dd, J=6.7, 1.0 Hz, 1H), 8.71 (d, J=7.4 Hz, 1H), 8.64 (d, J=4.5, 1.6 Hz, 1H), 8.11 (s, 1H), 7.81 (t, J=7.8 Hz, 1H), 7.71 (dd, J=8.1, 1.3 Hz, 1H), 7.56-7.66 (m, 6H), 7.50-7.55 (m, 1H), 7.02 (dd, J=6.7, 4.4 Hz, 1H), 6.44 (brs, 2H), 4.75 (t, J=6.9 Hz, 1H), 3.73 (dt, J=7.3, 3.6 Hz, 1H), 1.33 (d, J=6.6 Hz, 3H), 1.01-1.08 (m, 2H), 0.91-0.98 (m, 2H).

Example 3

(S)-2-amino-N-(1-(5-((1-cyclopropyl-1H-pyrazol-4-yl)ethynyl)-6-fluoro-4-oxo-3-phenyl-3,4-dihydroquinazolin-2-yl)ethyl)pyrazolo[1,5-a]pyrimidine-3-carboxamide

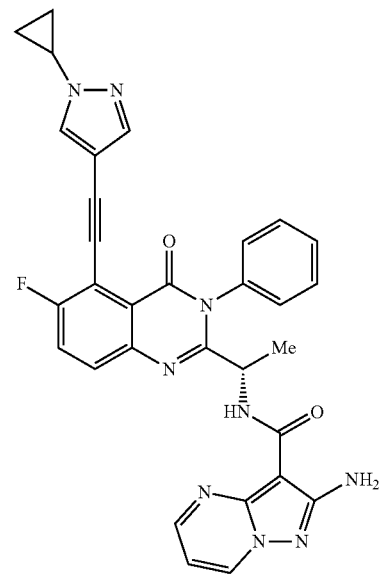 [SMILES: C[C@H](NC(=O)c1c(N)nn2cccnc12)c1cc2ccc(F)c(C#Cc3cnn(C4CC4)c3)c2c(=O)n1-c1ccccc1]

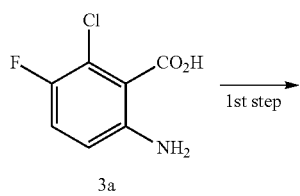

3a

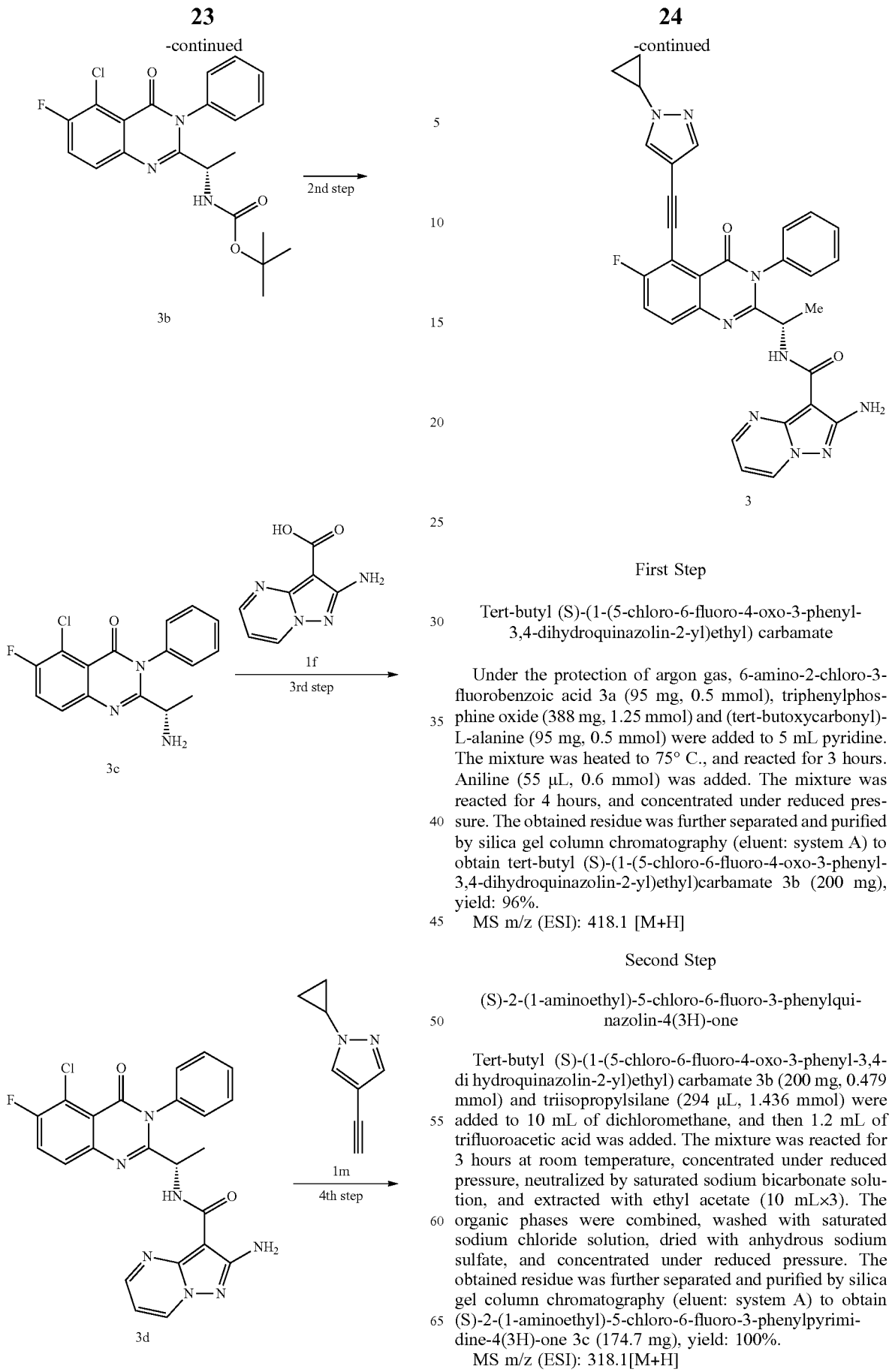

First Step

Tert-butyl (S)-(1-(5-chloro-6-fluoro-4-oxo-3-phenyl-3,4-dihydroquinazolin-2-yl)ethyl) carbamate Under the protection of argon gas, 6-amino-2-chloro-3-fluorobenzoic acid 3a (95 mg, 0.5 mmol), triphenylphosphine oxide (388 mg, 1.25 mmol) and (tert-butoxycarbonyl)-L-alanine (95 mg, 0.5 mmol) were added to 5 mL pyridine. The mixture was heated to 75° C., and reacted for 3 hours. Aniline (55 μL, 0.6 mmol) was added. The mixture was reacted for 4 hours, and concentrated under reduced pressure. The obtained residue was further separated and purified by silica gel column chromatography (eluent: system A) to obtain tert-butyl (S)-(1-(5-chloro-6-fluoro-4-oxo-3-phenyl-3,4-dihydroquinazolin-2-yl)ethyl)carbamate 3b (200 mg), yield: 96%.

MS m/z (ESI): 418.1 [M+H]

Second Step (S)-2-(1-aminoethyl)-5-chloro-6-fluoro-3-phenylquinazolin-4(3H)-one

Tert-butyl (S)-(1-(5-chloro-6-fluoro-4-oxo-3-phenyl-3,4-di hydroquinazolin-2-yl)ethyl) carbamate 3b (200 mg, 0.479 mmol) and triisopropylsilane (294 μL, 1.436 mmol) were added to 10 mL of dichloromethane, and then 1.2 mL of trifluoroacetic acid was added. The mixture was reacted for 3 hours at room temperature, concentrated under reduced pressure, neutralized by saturated sodium bicarbonate solution, and extracted with ethyl acetate (10 mL×3). The organic phases were combined, washed with saturated sodium chloride solution, dried with anhydrous sodium sulfate, and concentrated under reduced pressure. The obtained residue was further separated and purified by silica gel column chromatography (eluent: system A) to obtain (S)-2-(1-aminoethyl)-5-chloro-6-fluoro-3-phenylpyrimidine-4(3H)-one 3c (174.7 mg), yield: 100%.

MS m/z (ESI): 318.1[M+H]

Third Step (S)-2-amino-N-(1-(5-chloro-6-fluoro-4-oxo-3-phenyl-3,4-dihydroquinazolin-2-yl)ethyl) pyrazolo[1,5-c]pyrimidine-3-carboxamide Under the protection of argon gas, (S)-2-(1-aminoethyl)-5-chloro-6-fluoro-3-phenylquinazolin-4(3H)-one 3c (174.7 mg, 0.479 mmol), 2-aminopyrazolo[1,5-a]pyrimidine-3-carboxylic acid 1f (102 mg, 0.575 mmol), 1-(3-dimethylaminopropyl)-3-ethylcarbodiimide hydrochloride (139 mg, 0.719 mmol), 1-hydroxybenzotriazole (32 mg, 0.24 mmol), N,N-diisopropylethylamine (237 µL, 1.437 mmol) were dissolved in 5 mL of N,N-dimethylformamide and reacted at 35° C. for 4 hours. Ethyl acetate was added. The mixture was neutralized with dilute hydrochloric acid, washed with saturated sodium bicarbonate and sodium chloride solutions respectively. The organic phases were combined, dried with anhydrous sodium sulfate, and concentrated under reduced pressure. The obtained residue was further separated and purified by silica gel column chromatography (eluent: system B) to obtain (S)-2-amino-N-(1-(5-chloro-6-fluoro-4-oxo-3-phenyl-3,4-dihydroquinazolin-2-yl)ethyl)pyrazolo[1,5-c]pyrimidine-3-carboxamide 3d (210 mg), yield: 92%.

MS m/z (ESI): 478.1[M+H]

Fourth Step (S)-2-amino-N-(1-(5-((1-cyclopropyl-1H-pyrazol-4-yl)ethynyl)-6-fluoro-4-oxo-3-phenyl-3,4-dihydroquinazolin-2-yl)ethyl)pyrazolo[1,5-a]pyrimidine-3-carboxamide Under the protection of argon gas, (S)-2-amino-N-(1-(5-chloro-6-fluoro-4-oxo-3-phenyl-3,4-dihydropyrimidine-2-yl)ethyl)pyrazolo[1,5-c]pyrimidine-3-carboxamide 3d (210 mg, 0.440 mmol), [1,1'-bis(diphenylphosphino)ferrocene] palladium dichloride (35 mg, 0.044 mmol), cesium carbonate (468 mg, 1.437 mmol), 2-dicyclohexylphosphorus-2,4,6-triisopropylbiphenyl (46 mg, 0.096 mmol) and 1-cyclopropyl-4-ethynyl-1H-pyrazole 1m (96 mg, 0.719 mmol) were added to 20 mL of 1,4-dioxane, heated to 100° C., and reacted overnight. The mixture was filtered through celite. The filtrate was concentrated under reduced pressure, and ethyl acetate was added. The mixture was neutralized with dilute hydrochloric acid, washed with saturated sodium bicarbonate and sodium chloride solution. The organic phases were combined, dried with anhydrous sodium sulfate, and concentrated under reduced pressure. The obtained residue was further separated and purified by silica gel column chromatography (eluent: system B) to obtain (S)-2-amino-N-(1-(5-((1-cyclopropyl-1H-pyrazol-4-yl)ethynyl)-6-fluoro-4-oxo-3-phenyl-3,4-dihydroquinazolin-2-yl)ethyl)pyrazolo[1,5-a]pyrimidine-3-carboxamide 3 (147.4 mg), yield: 58.4%.

MS m/z (ESI): 574.2[M+H]

$^1$H NMR (400 MHz, DMSO-d6) δ ppm 8.92 (d, J=6.7 Hz, 1H), 8.69 (d, J=7.4 Hz, 1H), 8.64 (d, J=4.5 Hz, 1H), 8.16 (s, 1H), 7.72-7.87 (m, 2H), 7.49-7.67 (m, 6H), 6.97-7.07 (m, 1H), 6.44 (s, 2H), 4.69-4.80 (m, 1H), 3.69-3.79 (m, 1H), 1.32 (d, J=6.8 Hz, 3H), 1.03-1.09 (m, 2H), 0.90-0.99 (m, 2H).

Example 4

(S)-2-amino-N-(1-(8-((1-(oxetan-3-yl)-1H-pyrazol-4-yl)ethynyl)-1-oxo-2-phenyl-1,2-dihydroisoquinolin-3-yl)ethyl)pyrazolo[1,5-a]pyrimidine-3-carboxamide

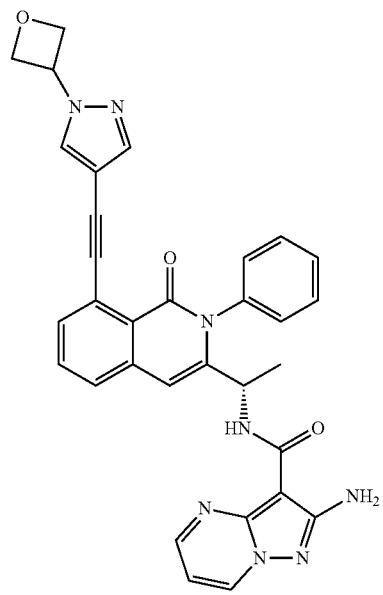 [SMILES: C[C@H](NC(=O)c1c(N)nn2cccnc12)c1cc2cccc(C#Cc3cnn(C4COC4)c3)c2c(=O)n1-c1ccccc1]

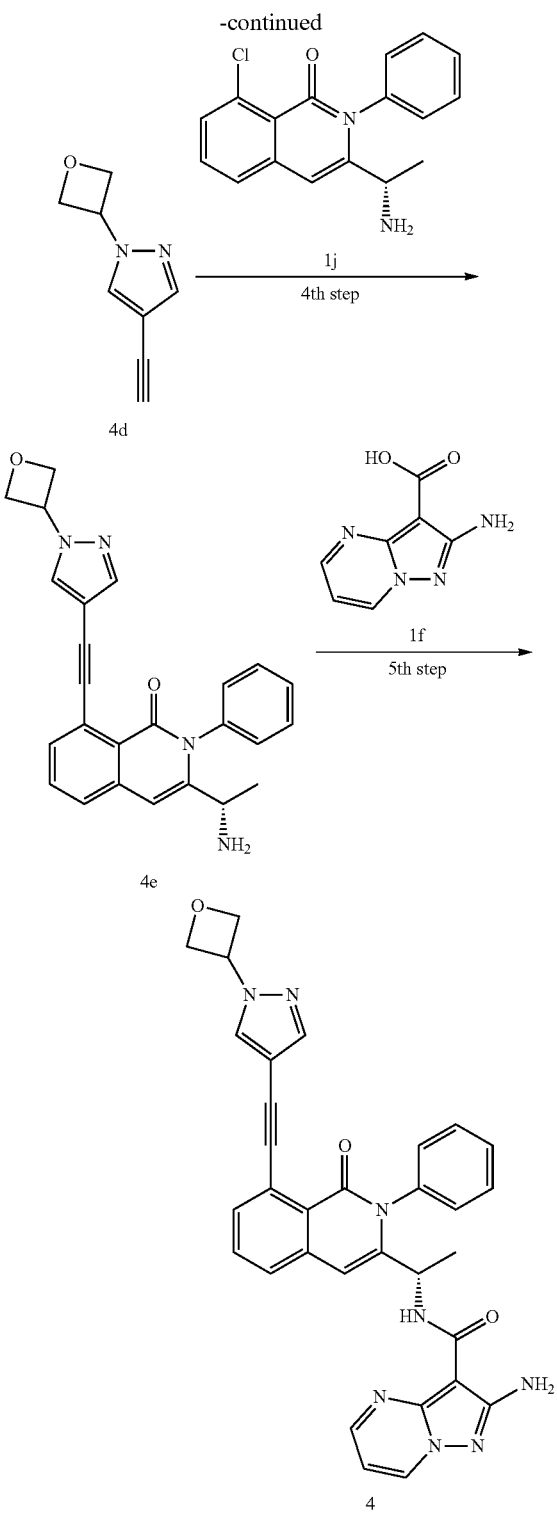

First Step

4-Iodo-1-(oxetan-3-yl)-1H-pyrazole

4-Iodo-1H-pyrazole 4a (5 g, 25.78 mmol) was dissolved in 20 mL of N,N-dimethylformamide. The temperature was controlled at 0° C. Sodium hydride (1.34 g, 33.52 mmol) was added thereto. After reacting for 10 minutes, 3-iodooxetane (2.44 mL, 28.35 mmol) was added. The mixture was heated to 65° C., and reacted for 3 hours. The reaction solution was added to saturated ammonium chloride solution, extracted with ethyl acetate (30 mL×2). The organic phases were combined, washed with water, dried with anhydrous sodium sulfate, and concentrated under reduced pressure to obtain 4-iodo-1-(oxetan-3-yl)-1H-pyrazole 4b (5.412 g), yield: 82.8%.

MS m/z (ESI): 250.8[M+H]

Second Step

1-(Oxetan-3-yl)-4-((trimethylsilyl)ethynyl)-1H-pyrazole

Under the protection of argon gas, 4-iodo-1-(oxetan-3-yl)-1H-pyrazole 4b (5.412 g, 21.65 mmol) was dissolved in 50 mL tetrahydrofuran, and bistriphenylphosphonium palladium dichloride (758 mg, 1.08 mmol), cuprous iodide (410.4 mg, 2.16 mmol) and 14 mL of triethylamine were added thereto. The temperature was controlled at 0° C. Ethynyltrimethylsilane (6.7 mL, 47.62 mmol) was added slowly. The mixture was reacted at room temperature 5 hours. 10 mL of water was added. The mixture was extracted with ethyl acetate (10 mL×3). The organic phases were combined, wash with water, dried over anhydrous sodium sulfate, and concentrated under reduced pressure. The obtained residue was further analyzed and purified by silica gel column chromatography (eluent: system A) to obtain 1-(oxetan-3-yl)-4-((trimethylsilyl)ethynyl)-1H-pyrazole 4c (2.6 g), yield: 54.6%.

MS m/z (ESI): 221.0[M+H]

Third Step

4-Ethynyl-1-(oxetan-3-yl)-1H-pyrazole

Under the protection of argon gas, 1-(oxetan-3-yl)-4-((trimethylsilyl)ethynyl)-1H-pyrazole 4c (0.6 g, 2.73 mmol) was dissolved in 5 mL of tetrahydrofuran. The temperature was controlled at 0° C. Tetrabutylammonium fluoride (855 mg, 3.27 mmol) was added. The mixture was reacted at room temperature for 1 hour, and concentrated under reduced pressure. The obtained residue was further analyzed and purified by silica gel column chromatography (eluent: system A) to obtain 4-ethynyl-1-(oxetan-3-yl)-1H-pyrazole 4d (0.236 g), yield: 58.6%.

$^1$H NMR (400 MHz, CDCl$_3$) δ ppm 7.73 (s, 1H), 7.69 (s, 1H), 5.42 (p, J=6.9 Hz, 1H), 4.99-5.07 (m, 4H), 3.03 (s, 1H).

Fourth Step

(S)-3-(1-aminoethyl)-8-((1-(oxetan-3-yl)-1H-pyrazol-4-yl)ethynyl)-2-phenylisoquinolin-1(2H)-one Under the protection of argon gas, (S)-3-(1-aminoethyl)-8-chloro-2-phenylisoquinolin-1(2H)-one 1j (200 mg, 0.67 mmol), bisacetonitrile palladium dichloride (17 mg, 0.067 mmol), cesium carbonate (659 mg, 2.01 mmol), 2-dicyclohexylphosphorus-2,4,6-triisopropylbiphenyl (95 mg, 0.2 mmol) and 4-ethynyl-1-(oxetan-3-yl)-1H-pyrazole 4d (148 mg, 1.0 mmol) were added to 10 mL of acetonitrile. The mixture was heated to 75° C., reacted for 4 hours, and concentrated under reduced pressure. Dichloromethane was added. The mixture was filtered with celite, and washed with water. The organic phases were combined, dried with anhydrous sodium sulfate, concentrated, and separated by thin layer preparation to obtain (S)-3-(1-aminoethyl)-8-((1-(oxetan-3-yl)-1H-pyrazol-4-yl)ethynyl)-2-phenylisoquinolin-1(2H)-one 4e (110 mg), yield: 40%.

$^1$H NMR (400 MHz, CDCl$_3$) δ ppm 7.82 (s, 1H), 7.74 (s, 1H), 7.64 (d, J=7.2 Hz, 1H), 7.50-7.58 (m, 3H), 7.42-7.50 (m, 2H), 7.27-7.35 (m, 2H), 6.75 (s, 1H), 5.40 (p, J=6.9 Hz, 1H), 4.97-5.05 (m, 4H), 3.71 (q, J=6.5 Hz, 1H), 2.00 (brs, 2H), 1.28 (d, J=6.5 Hz, 3H).

Fifth Step (S)-2-amino-N-(1-(8-((1-(oxetan-3-yl)-1H-pyrazol-4-yl)ethynyl)-1-oxo-2-phenyl-1,2-dihydroisoquinolin-3-yl)ethyl)pyrazolo[1,5-a]pyrimidine-3-carboxamide Under the protection of argon gas, (S)-3-(1-aminoethyl)-8-((1-(oxetan-3-yl)-1H-pyrazol-4-yl)ethynyl)-2-phenylisoquinoline-1(2H)-one 4e (110 mg, 0.268 mmol), 2-aminopyrazolo[1,5-a]pyrimidine-3-carboxylic acid if (50.1 mg, 0.28 mmol), 1-(3-dimethylaminopropyl)-3-ethylcarbodiimide hydrochloride (61.6 mg, 0.32 mmol), 1-hydroxybenzotriazole (3.6 mg, 0.0268 mmol), N, N-diisopropylethylamine (0.15 mL, 0.804 mmol) were dissolved in 3 mL of N,N-dimethylformamide and reacted at room temperature for 5 hours. Cold potassium carbonate solution (10 mL, 0.1 mol) was added slowly, and 15 mL water was added. The mixture was extracted with ethyl acetate (15 mL×3). The organic phases were combined, washed with 30 mL saturated sodium chloride solution, dried with anhydrous sodium sulfate, concentrated under reduced pressure, and separated by thin layer preparation to obtain (S)-2-amino-N-(1-(8-((1-(oxetan-3-yl)-1H-pyrazol-4-yl)ethynyl)-1-oxo-2-phenyl-1,2-dihydroisoquinolin-3-yl)ethyl)pyrazolo[1,5-a]pyrimidine-3-carboxamide 4 (110 mg), yield: 72%.

MS m/z (ESI): 570.8[M+H]

$^1$H NMR (400 MHz, DMSO-d6) δ ppm 8.93 (dd, J=6.7, 1.6 Hz, 1H), 8.55 (dd, J=4.6, 1.7 Hz, 1H), 8.21 (s, 1H), 8.00 (d, J=6.7 Hz, 1H), 7.76 (s, 1H), 7.61-7.66 (m, 2H), 7.54-7.60 (m, 2H), 7.44-7.52 (m, 3H), 7.36-7.40 (m, 1H), 7.01 (dd, J=6.8, 4.5 Hz, 1H), 6.75 (s, 1H), 6.42 (s, 2H), 5.55 (q, J=6.9 Hz, 1H), 4.83-4.92 (m, 4H), 4.53-4.58 (m, 1H), 1.35 (d, J=6.7 Hz, 3H).

Biological Evaluation

Test Example 1. Test of Inhibitory Activity of the Compound of the Present Invention on PI3K Kinase The following method is used to determine the degree of inhibition of recombinant human PI3Kα, PI3Kβ, PI3Kγ and PI3Kδ kinase activity by the compounds of the present invention under in vitro conditions. Promega's ADP-Glo Kinase Assay Kit (Cat. No. V9102) was used in this method. The above kit was a luminescence kinase detection kit, which was used to detect the ADP content produced by the kinase reaction. The ADP content was positively correlated with the kinase activity. By measuring the ADP content, the inhibition of the compound on the activity of PI3Kα, PI3Kβ, PI3Kγ and PI3Kδ kinases was reflected. For detailed experimental operations, please refer to the kit instructions. Recombinant human PI3Kα, PI3Kγ, and PI3Kδ were purchased from Invitrogen, and PI3Kβ was purchased from Promega (category numbers were PI3Kα: PV4788; PI3Kβ: V1751; PI3Kγ: PV4786 and PI3Kδ: PV6451 separately).

The experimental procedure is briefly described as follows: the test compound was first dissolved in DMSO to prepare a stock solution, and then the buffer was prepared according to the buffer formulation provided in the reagent manual (HEPES 50 mM, MgCl$_2$ 3 mM, EGTA 1 mM, CHAPS 0.03%, NaCl 100 mM, pH7.5). The buffer was used for gradient dilution. The final concentration of the test compound in the reaction system ranged from 1000 nM to 0.05 nM. The ATP Km values of PI3Kα, PI3Kβ, PI3Kγ, and PI3Kδ were determined by using a gradient diluted ATP solution (from ADP-Glo™ Kinase Assay Kit), and the ATP concentration in the reaction system was set to 10 μM based on the ATP Km value obtained in the experiment. The reaction was carried out in a 384-well microplate. First, the compound and a certain amount of PI3Kα, PI3Kβ, PI3Kγ or PI3Kδ protein were added to the wells, and incubated at room temperature for 15 minutes. Then ATP solution and PIP2:3PS (the final concentration was 0.01 mg/mL) were added to the reaction solution, and incubated at room temperature with shaking for 60 minutes. Then 5 μL of ADP-Glo Reagent (containing 10 mM MgCl$_2$) was added to the reaction system, and continued to incubate with shaking for 40 minutes at room temperature. Then 10μL Kinase Detection Reagent was added to the reaction system, and continued to incubate with shaking for 40 minutes at room temperature. After incubation, the chemiluminescence intensity value of each well was measured in Luminescence mode on the microplate reader. By comparing with the luminous intensity ratio of control group (0.1% DMSO), the percentage inhibition rate of the compound at each concentration was calculated. The GraphPad Prism 5 software was used to perform nonlinear regression analysis on the compound concentration logarithmic value vs. the inhibition rate to obtain IC$_{50}$ values of the compounds, and the result was shown on Table 1.

TABLE 1

The IC$_{50}$ values of activity inhibition of the compounds of the examples of the present invention and IPI-549 on PI3K kinase

| Compound | IC$_{50}$ (nM) | | | |
|---|---|---|---|---|
| | PI3Kα | PI3Kβ | PI3Kγ | PI3Kδ |
| IPI-549 | 99.10 | 147.8 | 1.05 | 170.2 |
| Example 1 | 101.3 | 237 | 0.46 | 460.7 |
| Example 2 | 214.5 | 466.3 | 0.58 | 191.4 |
| Example 3 | 143.2 | 551.9 | 0.70 | 195.2 |

TABLE 2

The selectivity of the inhibitory activity of the compounds of the Examples of the present invention and IPI-549 on PI3Kγ kinase compared to other subtypes

| Compound | IC$_{50}$ (PI3Kα)/ IC$_{50}$(PI3Kγ) | IC$_{50}$ (PI3Kβ)/ IC$_{50}$(PI3Kγ) | IC$_{50}$ (PI3Kδ)/ IC$_{50}$(PI3Kγ) |
|---|---|---|---|
| IPI-549 | 94 | 141 | 162 |
| Example 1 | 220 | 515 | 1002 |
| Example 2 | 370 | 804 | 330 |
| Example 3 | 205 | 666 | 279 |

It can be seen from Tables 1 and 2 that, compared with IPI-549, the compounds of Example 1, Example 2 and Example 3 of the present invention have significant inhibitory activity on PI3Kγ kinase, and the inhibitory activity on PI3Kγ kinase is significantly better than that of PI3Kα, PI3Kβ and PI3Kδ. The compound of the present invention has significant selective inhibitory effect on PI3Kγ.

Test Example 2. Test of Inhibition of the Compounds of the Present Invention on Cell Activity of PI3K Subtypes The following method was used to determine the degree of inhibition of the compounds of the present invention on activity of PI3Kα, PI3Kβ, PI3Kγ, and PI3Kδ kinase in different cells. The AlphaLISA SureFire Ultra p-AKT1/2/3 (pS473) kit (#ALSU-PAKT-B500) of PE company was used in the method. The above kit used AlphaLISA technology, using donor and acceptor beads to detect the interaction of biomolecules, to detect the content of p-AKT (pS473), reflecting the intensity of inhibition of the compounds on PI3Kα, PI3Kβ, PI3Kγ and PI3Kδ at the cell level. For detailed experimental operations, please refer to the kit instructions.

The experimental procedure was briefly described as follows: the experiment was carried out in a 384-well plate using a Multidrop dispenser (Thermo, #836-4049), using different cells for different PI3K subtypes (PI3Kα: C2C12 cells (myoblasts); PI3Kβ: PC-3 cells (human prostate cancer cells); PI3Kγ: Raw264.7 cells (monocyte macrophages); PI3Kδ: Raji cells (lymphoma cells)). 6 μL of the corresponding cells were transferred to the wells of a 384-well plate. After centrifugation 500 RPM for 30 seconds, the plate was placed in a 37° C., 5% $CO_2$ incubator for 2 hours. The test compound was first dissolved in DMSO to prepare a 10 mM stock solution, which was diluted 4-fold with DMSO. 30 nL was transferred by Echo (Labcyte, #550) to each well (final concentration is 10000 nM-0.2 nM), and incubated for 30 minutes. Then for C2C12 cells used for PI3Kα subtype, 2 uL IGF-1 (R&D, #291-G1-200, final concentration 1200 ng/mL) was added and incubated for 20 minutes. For PC-3 cells used for PI3Kβ subtype, 2 μL LPA (Sigma, #L7260, final concentration 15 ug/mL) was added and incubated for 20 minutes. For Raw264.7 cells used for PI3Kγ subtype, 2 uL C5a (Biotang, #RPR9899, final concentration 80 ng/mL) was added and incubated for 5 minutes. For Raji cells used for PI3Kδ subtype, 2 μL IgM (Jackson ImmunoResearch, #109-006-129, final concentration 3 ug/mL) was added and incubated for 10 minutes. After the incubation, AlphaLISA SureFire Ultra p-AKT1/2/3(pS473) kit was used to determine the AlphaLISA signal. The kit determination method was briefly described as follows: 20 μL Lysis Buffer was used to lyse the cells for 10 minutes. Then 5 uL acceptor mix and 5 uL donor mix were added to a 384-well plate. The plate was incubated with shaking at room temperature for 2 hours. Envision (PE, #2104) was used to read AlphaLISA signal. By comparing with the signal intensity ratio of the control group (0.5% DMSO), the percentage inhibition rate of the compound at each concentration was calculated. The GraphPad Prism 5 software was used to perform nonlinear regression analysis of the compound concentration logarithmic value vs. the inhibition rate to obtain the $IC_{50}$ values of the compounds, shown in Table 3.

TABLE 3

The $IC_{50}$ value of the cell activity inhibited by the compounds of the examples of the present invention on each subtype of PI3K

| | $IC_{50}$ (nM) | | | |
|---|---|---|---|---|
| Compound | PI3Kα(C2C12) | PI3Kβ(PC-3) | PI3Kγ(Raw264.7) | PI3Kδ(Raji) |
| Example 2 | 4768 | 878.1 | 3.42 | 355.2 |

TABLE 4

The selectivity of the cell inhibitory activity of the compounds of the Examples of the present invention on PI3Kγ compared to other subtypes

| | $IC_{50}$ (nM) | | |
|---|---|---|---|
| Compound | $IC_{50}$ (PI3Kα)/ $IC_{50}$ (PI3Kγ) | $IC_{50}$ (PI3Kβ)/ $IC_{50}$ (PI3Kγ) | $IC_{50}$ (PI3Kδ/ $IC_{50}$ (PI3Kγ) |
| Example 2 | 1394 | 257 | 104 |

It can be seen from Tables 3 and 4 that the compound of Example 2 of the present invention has a significant inhibitory effect on the cellular activity of PI3Kγ subtype, and the inhibition on cell activity of PI3Kγ subtype is significantly better than that on PI3Kα, PI3Kβ and PI3Kδ subtypes. Therefore, the compound of the present invention has a significant selective inhibitory effect on PI3Kγ subtype.

Test Example 3. Study on the Metabolic Stability of the Compound of the Present Invention in Mouse Liver Microsomes 1. Purpose The purpose of this experimental study is to investigate the metabolic stability of the compound of the present invention in mouse liver microsomes.

2. Reagent Information (see Table 5)

TABLE 5

Information of reagents used in the experiment

| Name | lot number | Supplier |
|---|---|---|
| Human mouse liver microsome | 5118007 | American Coming Corporation |
| Midazolam maleate | 171265-201402 | National Institute for Food and Drug control |
| NADPH | 20595626 | Swiss Roche Company |
| Potassium Dihydrogen Phosphate | 20150428 | Sinopharm Chemical Reagent Co., Ltd. |

TABLE 5-continued

Information of reagents used in the experiment

| Name | lot number | Supplier |
| --- | --- | --- |
| Dipotassium phosphate | 20150312 | Sinopharm Chemical Reagent Co., Ltd. |
| Magnesium chloride (MgCl$_2$) | F20090916 | Sinopharm Chemical Reagent Co., Ltd. |
| Verapamil hydrochloride | 100223-200102 | National Institute for Food and Drug control |
| Glibenclamide | 100135-201105 | National Institute for Food and Drug control |
| DMSO | 1427C108 | American Amresco Company |
| Methanol | QADG3H | American Honeywell Company |
| Acetonitrile | S13A1H | American Honeywell Company |
| Formic acid | A1819048 | Shanghai Aladdin Biochemical Technology Co., Ltd. |

3. Experimental Scheme

The test compound was co-incubated with human liver microsomes, and coenzyme NADPH was added to initiate the reaction. At 0, 5, 15, 30 and 60 minutes, 20 μL of incubation solution was taken out and transferred to 200 μL of acetonitrile containing internal standard to stop the reaction. After protein precipitation, centrifugation was performed at 3,700 rpm for 10 minutes and the supernatant was taken. The supernatant was diluted 1:1 with water and analyzed by LC-MS/MS method. According to the elimination half-life of the test compound in the incubation system, the in vitro intrinsic clearance rate was calculated. Midazolam was used as the internal reference compound and incubated for two aliquots in parallel. The incubation conditions are summarized in Table 6 below:

TABLE 6

The incubation conditions of the compounds of the Examples of the present invention, IPI-549 and compound 21 in WO2015051244A1

| | |
| --- | --- |
| Liver microsome | 0.5 mg · mL$^{-1}$ (Test compound); 0.2 mg · mL$^{-1}$ (midazolam) |
| Incubation buffer | phosphate buffer (100 mM, pH 7.4) |
| Initial incubation concentration of test compound | 1 μM |
| Final volume of incubation system | 0.2 mL |
| Incubation time | 0, 5, 15, 30, 60 min (Compounds of the invention) 0, 5, 20 min (Midazolam) |
| Magnesium chloride | 3 mM |
| NADPH | 1 mM |
| Parallel reaction | 2 aliquots in parallel |

4. Data Analysis

The ratio of peak area of the analyte/internal standard ($A_{analyte}/A_{IS}$) was obtained by the instrument. The remaining percentage (% Control) was calculated from the ratio of $A_{analyte}/A_{IS}$ in the non-zero time point sample to the zero time point sample. Ln (% Control) versus incubation time was plotted and a linear fit was performed. The clearance constant (k, min$^{-1}$), the clearance half-life ($T_{1/2}$, min) and the in vitro intrinsic clearance rate ($CL_{int}$, mL·min$^{-1}$·mg$^{-1}$ proteins) of the test compound were calculated by the following equations.

k=−slope $T_{1/2}$=0.693/k $CL_{int}$=k/$C_{protein}$ $C_{protein}$(mg·mL$^{-1}$) refers to the concentration of microsomal protein in the incubation system.

5. Experimental Results (see Table 7)

TABLE 7

Related parameters of the stability of human liver microsomes of the compound of the Examples of the present invention, IPI-549 and compound 21 in WO2015051244A1

| Compound | half-life period/($T_{1/2}$, min) |
| --- | --- |
| IPI-549 | 195 |
| Compound 21 in WO2015051244A1 | 113 |
| Example 1 | 11682 |
| Example 2 | 233 |
| Example 3 | 574 |

Conclusion: Compared with IPI-549 and compound 21 disclosed in WO2015051244A1, the half-life of the compounds of Example 1, Example 2 and Example 3 of the present invention were significantly prolonged, and the stability of human liver microsomes was significantly improved.

The structure of compound 21 disclosed in the application WO2015051244A1 is as follows:

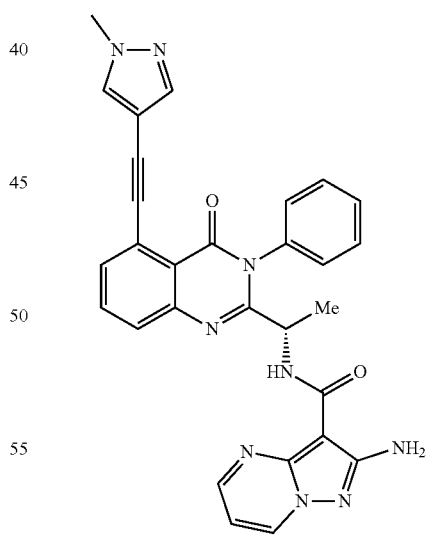

Test Example 4. Study on Oral Pharmacokinetics of the Compound of the Present Invention in ICR Mice 1. Purpose Using ICR mice as the test animals, the mice were intragastrically administered with the compound of the present invention. LC/MS/MS method was used to determine the drug concentration in the plasma at different times to study the pharmacokinetic characteristics of the compound of the present invention in mice.

2. Experimental Scheme 2.1 Experimental Drugs and Animals

IPI-549, the compound of Example 1 and the compound of Example 2 of the present invention;

Twenty-seven healthy adult male ICR mice were purchased from Weitong Lihua Experimental Animal Technology Co., Ltd., and the animal quality certificate number was 1903040021.

2.2 Drug Formulation and Administration

An appropriate amount of the compound to be tested was weighed, and 0.5% sodium carboxymethylcellulose (containing 0.05% Tween80) was added. The mixture was vortexed, and sonicated so that the solid was ultrasonically dispersed uniformly to obtain a suspension; 100 μL×2 of the preparation were aspirated, and placed in 1.5-mL EP tubes, stored at 2 to 8° C. The concentration of the preparation was 0.5 mg/mL.

Twenty-seven healthy adult ICR male mice were fasted overnight and then intragastrically administered (dosage of administration was 5 mg/kg), and fed 4 hours after administration.

2.3 Sample Collection

At 0.083 hours, 0.25 hours, 0.5 hours, 1 hour, 2 hours, 4 hours, 8 hours, 12 hours, and 24 hours after administration, 80 μL of blood was collected from the orbital vein. About 0.08 mL of blood was collected, and placed in EDTA-K2 anticoagulation tube. The collected blood samples were placed on ice and centrifuged to separate the plasma (centrifugation conditions: 1500 g, 10 minutes). The collected plasma was stored at −40 to −20° C. before analysis. The LC-MS/NIS method was used to determine the content of the test compound in the plasma of ICR mice after intragastric administration of different compounds.

3. Pharmacokinetic Parameter Results

The pharmacokinetic parameters of the compounds of the Examples of the present invention and the positive control compound IPI-549 are shown in Table 8 below.

TABLE 8

The pharmacokinetic parameters of the compounds of the present invention and IPI-549

| Compounds | Mode and dosage of administration | Plasma concentration Cmax (ng/mL) | Area under the curve $AUC_{0-\infty}$ (ng · h/mL) | Half-life period $T^{1/2}(h)$ | Bioavailability F(%) |
|---|---|---|---|---|---|
| IPI-549 | Oral (5 mg/kg) | 484 | 2660 | 2.7 | 20 |
| Example 1 | Oral (5 mg/kg) | 898 | 7470 | 3.1 | 33 |
| Example 2 | Oral (5 mg/kg) | 1730 | 15100 | 3.4 | 60 |

Conclusion: Compared with IPI-549, the compounds of Example 1 and Example 2 of the present invention significantly increased the blood drug concentration and area under the curve in ICR mice, and have excellent pharmacokinetic absorption, prolonged half-life, significantly improved bioavailability and good pharmacokinetic properties.

Test Example 5. Study on Oral Pharmacokinetics of the Compound of the Present Invention in SD Rats 1. Purpose Using SD rats as test animals, the rats were intragastrically administrated with the compound of the present invention. LC/MS/MS method was used to determine the drug concentration in the plasma at different times to study the pharmacokinetic characteristics of the compound of the present invention in rats.

2. Experimental Scheme 2.1 Experimental Drugs and Animals

IPI-549, the compounds of Example 1 and Example 2 of the present invention;

9 healthy adult Sprague Dawley (SD) male rats were purchased from Weitong Lihua Laboratory Animal Technology Co., Ltd., and the production license number was 11400700271077.

2.2 Drug Formulation and Administration

Oral Gavage Group:

An appropriate amount of the compound to be tested was weighed, and 0.5% sodium carboxymethylcellulose (containing 0.05% Tween80) was added. The mixture was vortexed, and sonicated so that the solid was ultrasonically dispersed uniformly to obtain a suspension. 100 μL×2 of the filtered preparation were aspirated, and placed in 1.5-mL EP tubes, stored at 2 of 8° C. The concentration of the preparation was 0.5 mg/mL.

Nine healthy adult male SD rats were fasted overnight and then intragastrically administered (dosage of administration was 5 mg/kg), and fed 4 hours after administration.

2.3 Sample Collection

About 0.2 mL of blood was collected from the jugular vein at 0.083 hours, 0.25 hours, 0.5 hours, 1 hour, 2 hours, 4 hours, 8 hours, 12 hours, and 24 hours after administration, and heparin sodium was used for anticoagulation. The collected blood samples were placed on ice and centrifuged to separate the plasma (centrifugation conditions: 1500 g, 10 minutes). The collected plasma was stored at −40 to −20° C. before analysis. The LC-MS/MS method was used to determine the content of the test compound in the plasma of SD rats after intragastric administration of different compounds.

3. Pharmacokinetic Parameter Results

The pharmacokinetic parameters of the compounds of the Examples of the present invention and the positive control compound IPI-549 are shown in Table 9 below.

TABLE 9

The pharmacokinetic parameters of the compound of the present invention and IPI-549

| Compounds | Mode and dosage of administration | Plasma concentration Cmax (ng/mL) | Area under the curve $AUC_{0-\infty}$ (ng · h/mL) | Half-life period $T_{1/2}$(h) | Bioavailability F(%) |
|---|---|---|---|---|---|
| IPI-549 | Oral (5 mg/kg) | 358 | 1950 | 2.4 | 10 |
| Example 1 | Oral (5 mg/kg) | 587 | 3940 | 5.1 | 27 |
| Example 2 | Oral (5 mg/kg) | 1160 | 11000 | 4.1 | 66 |

Conclusion: Compared with IPI-549, the compounds of Example 1 and Example 2 of the present invention have excellent pharmacokinetic absorption in SD rats, prolonged half-life, and have significantly improved blood drug concentration, area under the curve and bioavailability, and good pharmacokinetic properties.

Test Example 6. Pharmacodynamic Test of the Compound of the Present Invention Combined with PD-L1 Monoclonal Antibody on the Growth Inhibitory Effect of CT26 Mouse Colon Cancer Cell Subcutaneously Transplanted Tumor Model 1. Purpose The anti-tumor effect of the combination of the compound of Example 2 and PD-L1 monoclonal antibody in CT26 mouse colon cancer cell subcutaneously transplanted tumor model was evaluated.

2. Preparation of Test Substance 2.1 Preparation of Blank Administration Preparation:

The blank control group was given 5% NMP (N-methylpyrrolidone)+95% PEG400, with administration volume of 0.1 mL/10 g.

2.2 Preparation of Compound Administration Formulation of Example 2

An appropriate amount of the compound of Example 2 was weighed into a centrifuge tube, and 5% NMP 95% PEG400 was added. The mixture was vortexed to a fully soluble solution with a concentration of 6 mg/mL, which was prepared before immediate use.

2.3 Preparation of PD-L1 Monoclonal Antibody

Recombinant anti-PD-L1 whole mouse monoclonal antibody (InVivoMAb anti-mouse PD-L1 (B7-H1), purchased from Bioxcell, Clone 10F.9G2, catalog number: BE0101, batch number: 720619F1) was diluted with PBS so that the concentration was 1 mg/mL, which was prepared before immediate use.

3. Experimental Animal

BALB/c mice, female, 7-8 weeks (the age of mice at the time of tumor cell inoculation), weight of 18.4-19.1 g, 9 mice in each group, purchased from Zhejiang Weitong Lihua Laboratory Animal Technology Co., Ltd., license number: SOCK (Zhejiang) 2019-0001.

4. CT26 Mouse Colon Cancer Culture

CT26 mouse colon cancer cells were cultured in RPMI-1640 culture medium containing 10% fetal bovine serum, 100 U/mL penicillin and 100 µg/mL streptomycin. CT26 cells in the exponential growth phase were collected and resuspended in PBS to a suitable concentration for subcutaneous tumor inoculation in mice.

5. Animal Vaccination and Grouping

Female BALB/c mice were subcutaneously inoculated with $2.5 \times 10^5$ CT26 cells on the back. When the average tumor volume was about 127 mm$^3$, they were randomly grouped according to the size of the tumor. They were divided into 4 groups with each group of 9 animals, and the day of grouping was defined as day 0.

6. Animal Administration and Observation

After tumor inoculation, routine monitoring included the effects of tumor growth and treatment on the normal behavior of animals. The specific content included the activity of the experimental animal, food and water consumption, weight gain or loss, abnormal conditions of eyes, coat and others. The tumor volume was weighed and measured twice a week. The administration period was 21 days. On the 21st day, the mice were weighed and the tumor volume was measured. The next day after the tumor volume was measured, the mice were sacrificed and tumor masses were taken and weighed. The tumor volume (TV), relative tumor volume (RTV), relative tumor growth rate (T/C), tumor inhibition percentage (IR) and relative tumor inhibition rate (TGI) were calculated, and statistical testing was performed. The calculation formulas were as follows:

(1) $TV=1/2 \times a \times b^2$, where a and b represent the length and width of the tumor respectively;

(2) $RTV=V_t/V_0$, where $V_0$ is the tumor volume measured during administration in grouping (i.e. d0), and $V_t$ is the tumor volume during each measurement;

(3) TGI (%)=(1−T/C)×100%; wherein, T/C % is the relative tumor proliferation rate, the percentage values of relative tumor volume of the treatment group to the control group at a certain time point, T and C are the relative tumor volume of the treatment group and the control group at a specific time point, respectively, T/C (%)=$T_{RTV}/C_{RTV} \times 100\%$, where $T_{RTV}$ is the RTV of the treatment group and $C_{RTV}$ is the RTV of the control group;

(4) IR (%)=(1−$TW_t/TW_c$) 100%, where $TW_t$ is the tumor weight of the treatment group and $TW_c$ is the tumor weight of the control group.

7. Result

The pharmacodynamic parameters of each group in the CT26 mouse colon cancer model on the 21st day after administration are shown in Table 10 below.

TABLE 10

Pharmacodynamic analysis table of each group in CT26 mouse colon cancer model on the 21st day after administration

| Experiment group | Dosage of administration | Mode and Frequency of administration | TV ($\bar{x} \pm S$) | RTV ($\bar{x} \pm S$) | TGI (%) |
|---|---|---|---|---|---|
| Solvent control group | — | Gavage, once a day | 1445.38 ± 257.38 | 11.21 ± 1.11 | — |
| Compound of Example 2 | 60 mg/kg | Gavage, once a day | 723.47 ± 159.50 | 5.47 ± 1.05 | 51.2 |
| Compound of Example 2 + Anti-PD-L1 (combination treatment group) | 60 mg/kg; 200 μg each | (gavage, once a day) + (Intraperitoneal injection, once every 3 days, 4 times in total) | 325.73 ± 78.41 | 2.54 ± 0.60 | 77.3 |
| Anti-PD-L1 | 200 μg each | Intraperitoneal injection, once every 3 days, 4 times in total | 851.99 ± 171.49 | 6.87 ± 1.43 | 38.7 |

TABLE 11

Tumor weight analysis of mice in each group of CT26 mouse colon cancer model on the 21st day after administration

| Experiment group | Dosage of administration | Mode and Frequency of administration | Tumor weight (g) ($\bar{x} \pm S$) | IR(%) |
|---|---|---|---|---|
| Solvent control group | — | Gavage, once a day | 1.2414 ± 0.2328 | — |
| Compound of Example 2 | 60 mg/kg | Gavage, once a day | 0.5942 ± 0.1730 | 52.1% |
| Compound of Example 2 + Anti-PD-L1 (combination treatment group) | 60 mg/kg; 200 μg each | (gavage, once a day) + (Intraperitoneal injection, once every 3 days, 4 times in total) | 0.2605 ± 0.0980 | 79.0% |
| Anti-PD-L1 | 200 μg each | Intraperitoneal injection, once every 3 days, 4 times in total | 0.7966 ± 0.1744 | 35.8% |

It can be seen from Tables 10 and 11 that on the 21st day after administration, in the CT26 mouse colon cancer model, the TGI of the 60 mg/kg single-agent treatment group, combination treatment group and Anti-PD-L1 group of the compound of Example 2 of the present invention were 51.2%, 77.3%, and 38.7%, and IR were 52.1%, 79.0%, and 35.8%, respectively. There was no significant change in body weight. This indicates that the 60 mg/kg single-agent treatment group and the combination treatment group of the compound of Example 2 of the present invention both showed a significant and effective effect of inhibiting tumor growth, and the effect of inhibiting tumor growth in the combination treatment group was better than that of the single-agent treatment group.

The invention claimed is:

1. The compound of formula (I) or a stereoisomer, a tautomer or a pharmaceutically acceptable salt thereof:

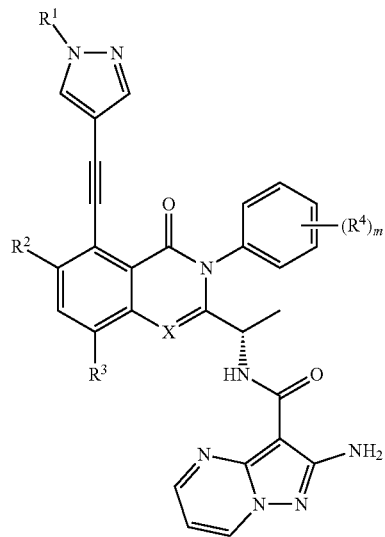

(I)

wherein:

X is selected from CH or N;

R¹ is selected from cycloalkyl or heterocyclyl, wherein said cycloalkyl or heterocyclyl is optionally further substituted by one or more substituents selected from hydroxyl, halogen, nitro, cyano, alkyl, alkoxy, cycloalkyl, heterocyclyl, aryl, heteroaryl or —NR⁵R⁶;

R² and R³ are each independently selected from hydrogen atom, alkyl, alkoxy, cyano or halogen, wherein the alkyl or alkoxy is optionally further substituted with one or more halogens;

R⁴ is the same or different, each independently selected from hydrogen atom, alkyl, alkoxy, cyano or halogen, wherein the alkyl or alkoxy is optionally further substituted with one or more halogens;

R⁵ and R⁶ are each independently selected from hydrogen atom, alkyl or cycloalkyl, wherein the alkyl or cycloalkyl is optionally further substituted by one or more substituents selected from hydroxyl, halogen, cyano, alkyl, alkoxy, cycloalkyl or heterocyclyl; and m is 0, 1, 2, 3, 4, or 5.

2. The compound or the stereoisomer, tautomer, or pharmaceutically acceptable salt thereof according to claim 1, wherein: R¹ is cyclopropyl, cyclobutyl, cyclopentyl, cyclohexyl or oxetanyl.

3. The compound or the stereoisomer, tautomer, or pharmaceutically acceptable salt thereof according to claim 1, wherein: R¹ is cyclopropyl or oxetanyl.

4. The compound or the stereoisomer, tautomer, or pharmaceutically acceptable salt thereof according to claim 1, wherein: R² and R³ are each independently selected from hydrogen atom or halogen.

5. The compound or the stereoisomer, tautomer, or pharmaceutically acceptable salt thereof according to claim 1, wherein: R⁴ is the same or different, each independently selected from hydrogen atom, alkyl or halogen, and m is 0, 1, 2 or 3.

6. The compound or the stereoisomer, tautomer, or pharmaceutically acceptable salt thereof according to claim 1, wherein the compound is selected from:

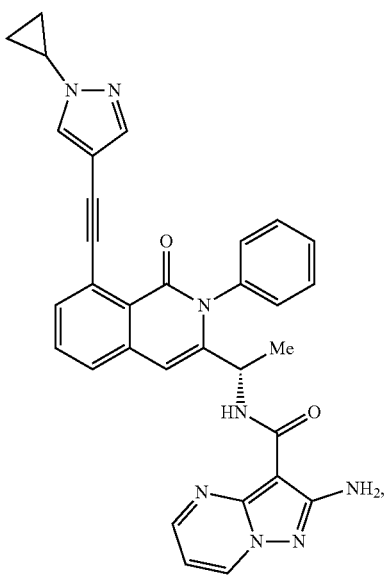

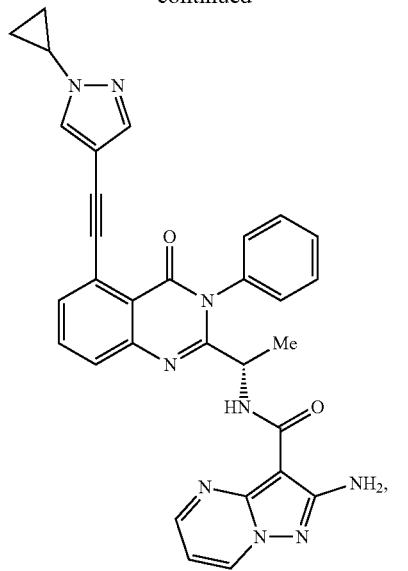

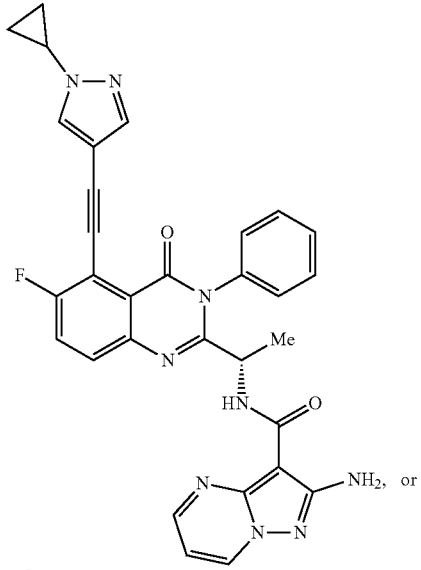

or

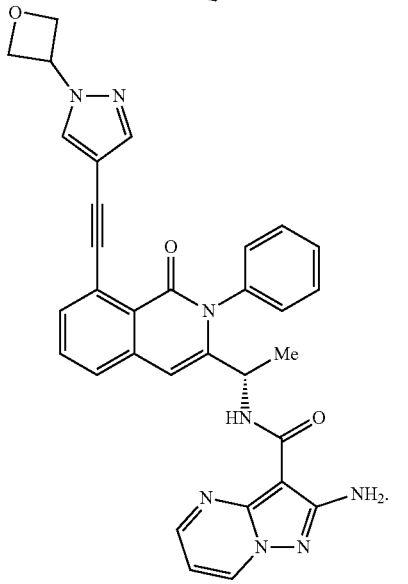

7. A pharmaceutical composition comprising an effective dose of the compound or the stereoisomer, tautomer, or pharmaceutically acceptable salt thereof according to claim 1, and pharmaceutically acceptable carriers, excipients or combinations thereof.

8. The compound or the stereoisomer, tautomer, or pharmaceutically acceptable salt thereof according to claim 1, wherein: $R^2$ and $R^3$ are both fluorine.

9. The compound or the stereoisomer, tautomer, or pharmaceutically acceptable salt thereof according to claim 1, wherein $R^4$ is hydrogen.

\* \* \* \* \*